US007292299B2

(12) United States Patent
Hiyama et al.

(10) Patent No.: US 7,292,299 B2
(45) Date of Patent: Nov. 6, 2007

(54) LIQUID CRYSTAL DISPLAY APPARATUS

(75) Inventors: Ikuo Hiyama, Tokyo (JP); Shinichi Komura, Tokyo (JP); Tsunenori Yamamoto, Tokyo (JP); Yuka Utsumi, Tokyo (JP); Mutsumi Maehara, Tokyo (JP); Daisuke Kajita, Tokyo (JP)

(73) Assignee: Hitachi Displays, Chiba (JP)

( * ) Notice: Subject to any disclaimer, the term of this patent is extended or adjusted under 35 U.S.C. 154(b) by 256 days.

(21) Appl. No.: 10/956,254

(22) Filed: Sep. 30, 2004

(65) Prior Publication Data

US 2005/0068480 A1   Mar. 31, 2005

(30) Foreign Application Priority Data

Sep. 30, 2003  (JP) ............... 2003-339047
Jul. 28, 2004  (JP) ............... 2004-219489

(51) Int. Cl.
   *G02F 1/1335*  (2006.01)
(52) U.S. Cl. ............... 349/119; 349/102; 349/99; 349/121
(58) Field of Classification Search ........ 349/117–119, 349/121, 99, 102–103, 141
See application file for complete search history.

(56) References Cited

U.S. PATENT DOCUMENTS 5,598,285 A * 1/1997 Kondo et al. ............ 349/39
6,307,608 B1 * 10/2001 Sakamoto ............... 349/119
6,603,523 B2 * 8/2003 Nakamura et al. ......... 349/119
6,646,701 B2 * 11/2003 Lyu et al. ............... 349/119
6,762,814 B2    7/2004 Watanabe
7,164,458 B2 * 1/2007 Itakura et al. ............ 349/119
2003/0122991 A1  7/2003 Itakura et al.

FOREIGN PATENT DOCUMENTS

| JP | 09-080424   | 3/1997  |
| JP | 11-133408   | 5/1999  |
| JP | 2982869     | 11/1999 |
| JP | 2001-290149 | 10/2001 |
| JP | 2001-350022 | 12/2001 |

* cited by examiner

*Primary Examiner*—Toan Ton
(74) *Attorney, Agent, or Firm*—Hogan & Hartson LLP

(57) ABSTRACT

In an in-plane switching (ISP) mode controlling transmission and shielding of light by application of lateral electric field to liquid crystal molecules aligned in the direction in parallel to a substrate, increase in luminance or color shift at a black-representation area or upon black-representation condition at an inclined viewing angle is reduced. First and second polarizing plates sandwiching a liquid crystal layer each have a supporting member (plate) on at least either surface thereof. The supporting member on the inside surface of the first polarizing plate on the side of an illumination unit has a retardation in the thickness direction $R1 \cdot h1$ and the supporting member on the inside surface of the second polarizing plate has a retardation in the thickness direction $R2 \cdot h2$. In the O-mode, $R1 \cdot h1 > R2 \cdot h2$ and in the E-mode, $R1 \cdot h1 < R2 \cdot h2$.

18 Claims, 23 Drawing Sheets

$S1 = \cos La \cos Lo$
$S2 = \cos La \sin Lo$
$S3 = \sin La$ $S1 = \langle |Ex|^2 \rangle - \langle |Ey|^2 \rangle$
$S2 = \langle 2ExEy \cos \delta \rangle$
$S3 = \langle 2ExEy \sin \delta \rangle$
$\delta = \phi y - \phi x$ FIG.11A
FIG.11B
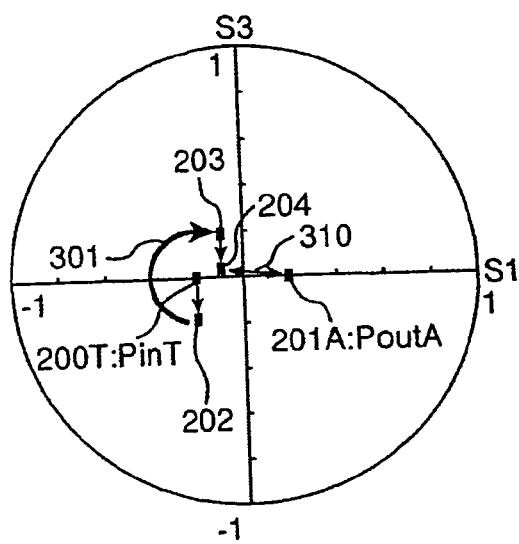
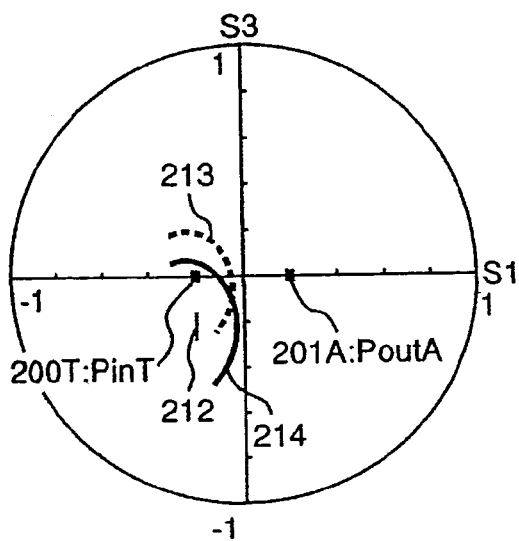
FIG.12A
FIG.12B
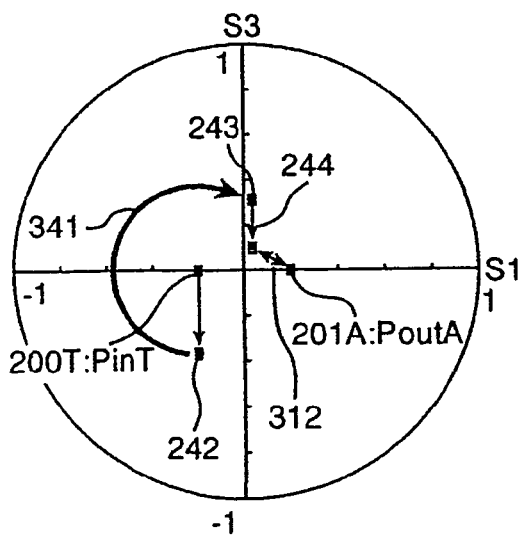
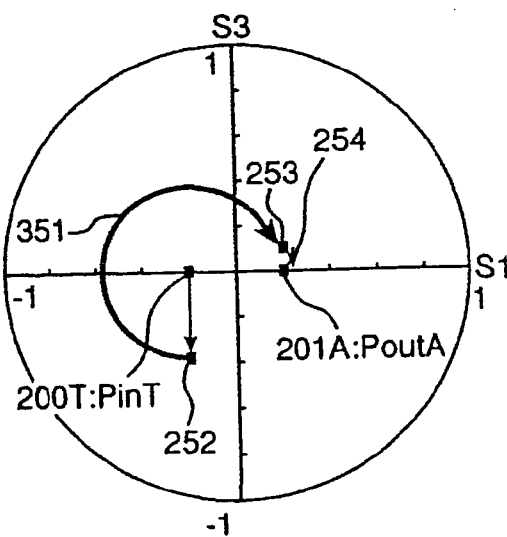

FIG.29A          FIG.29B
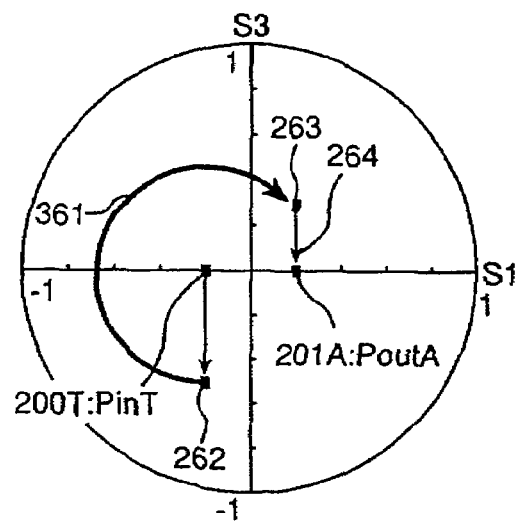
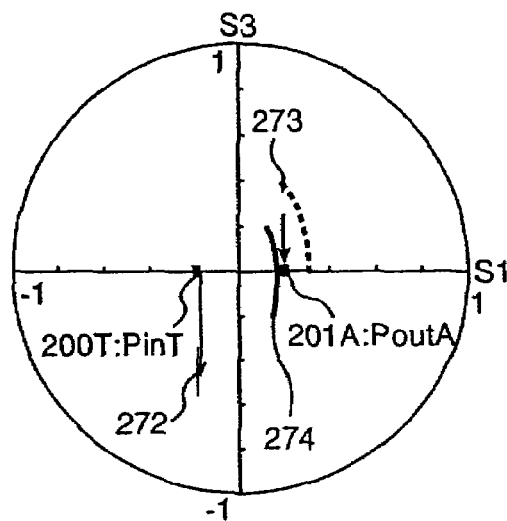
FIG.30
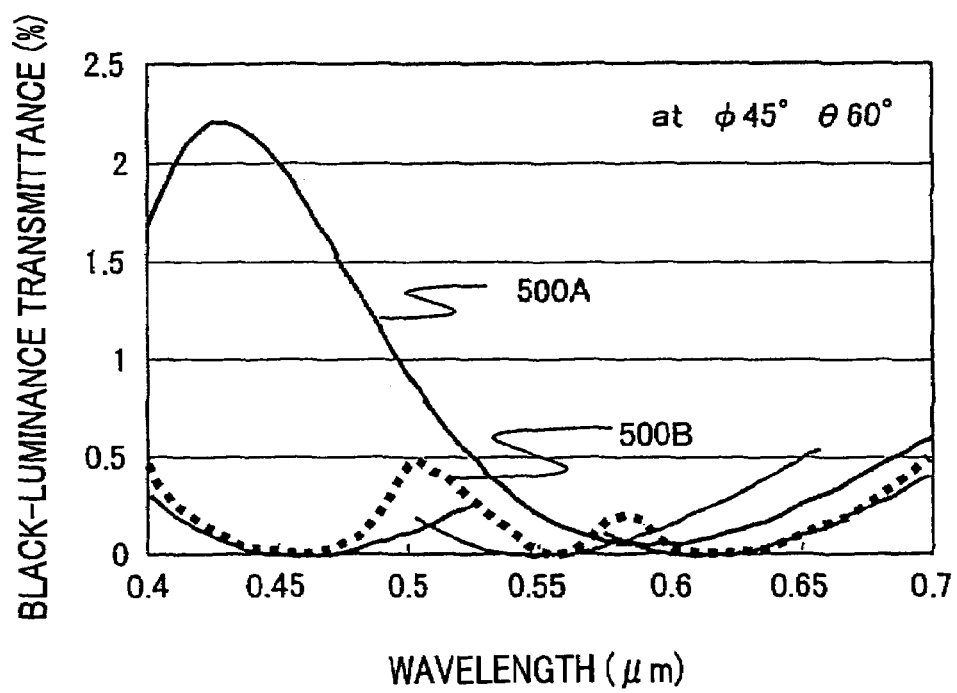

FIG.31A
FIG.31B
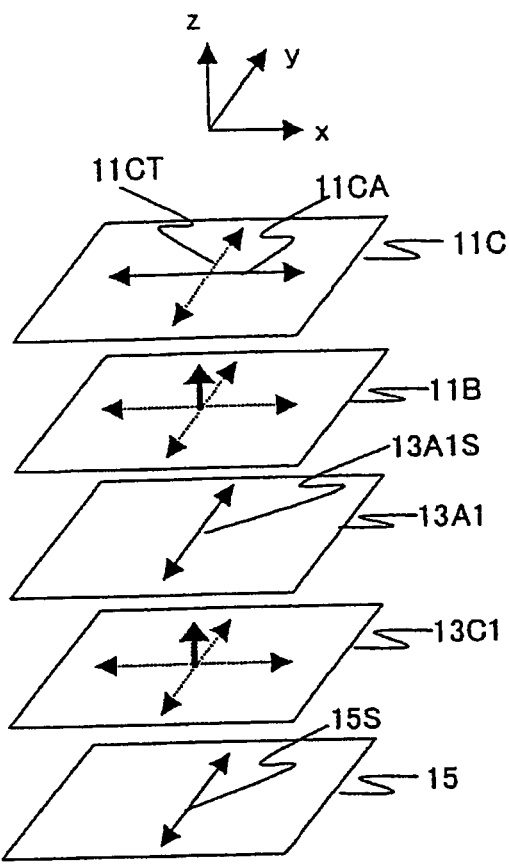
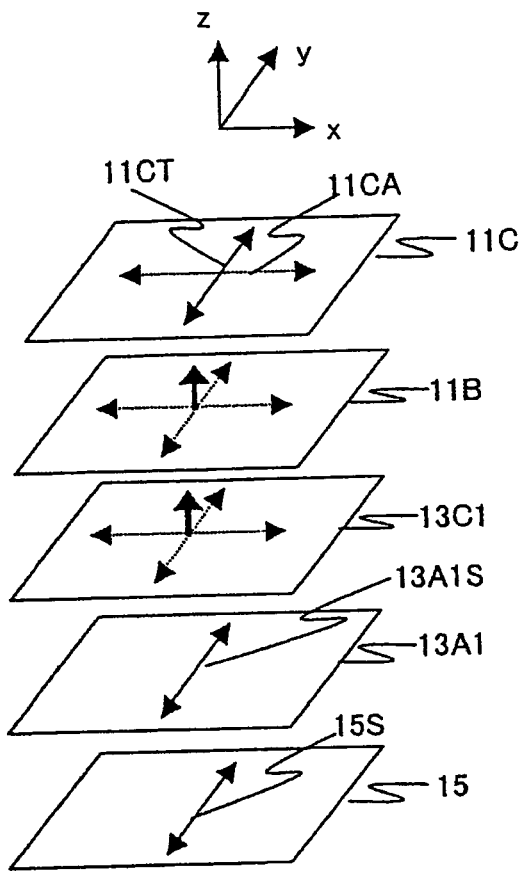
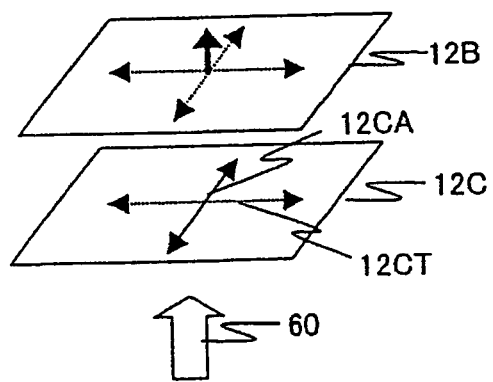
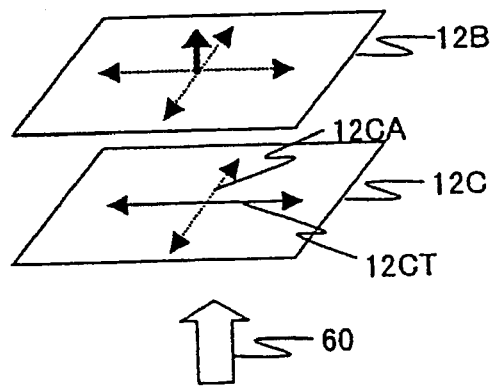

FIG.32A
FIG.32B
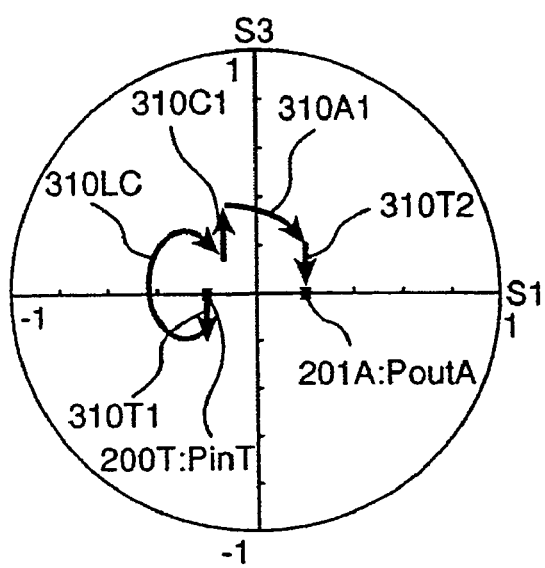
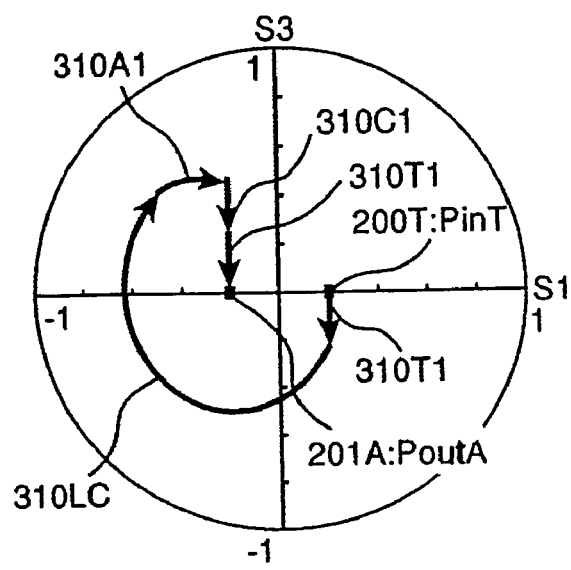

FIG.35A
FIG.35B
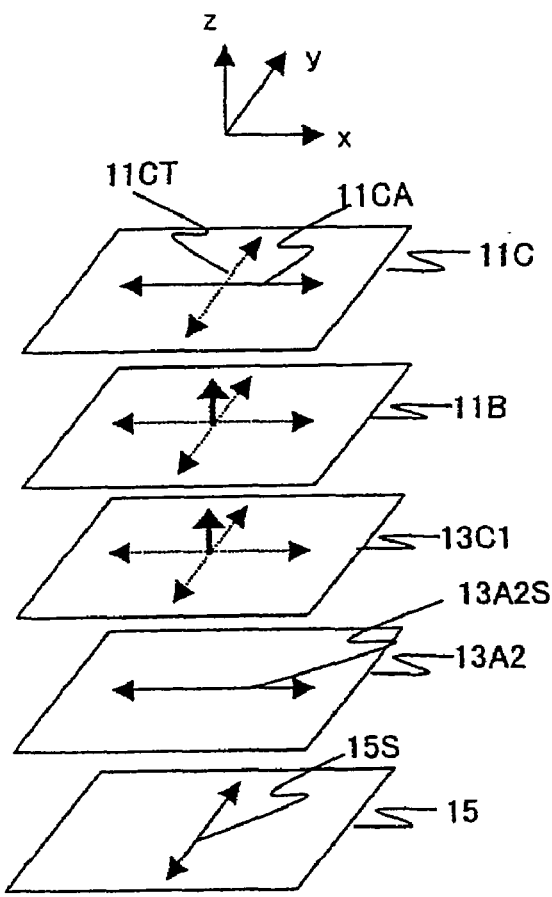
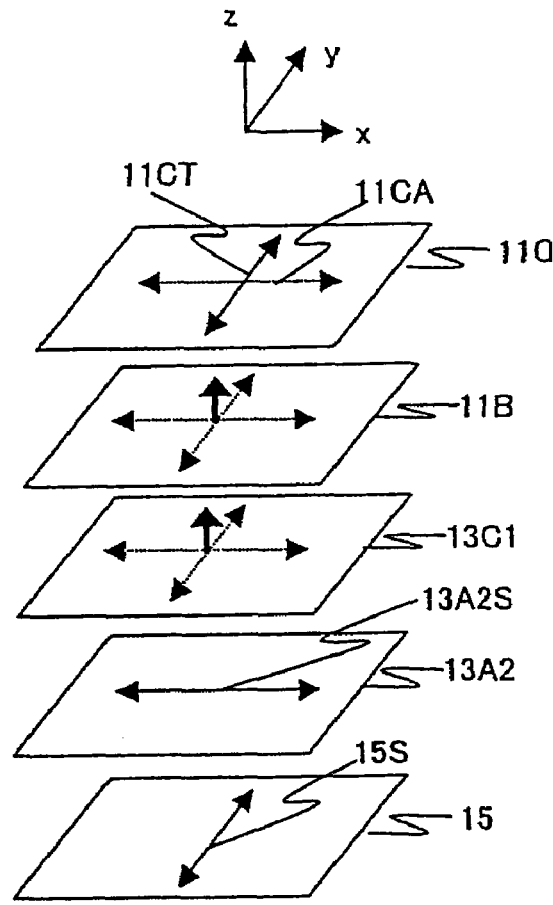
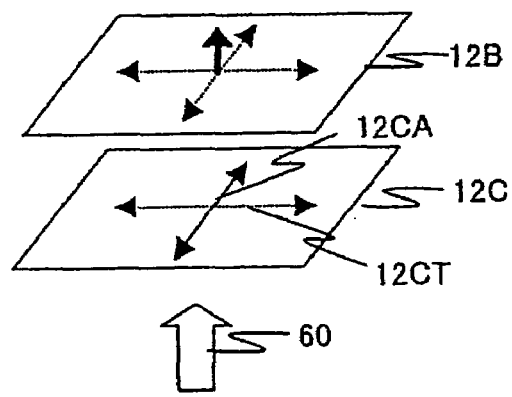
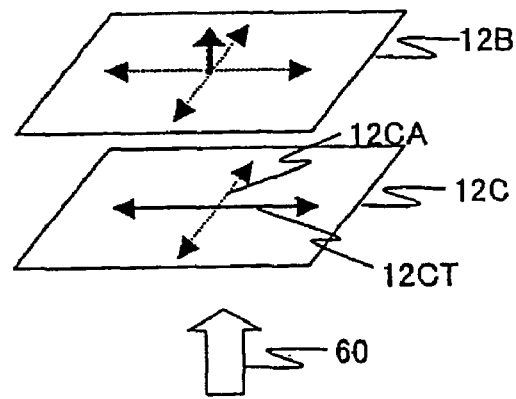

LIQUID CRYSTAL DISPLAY APPARATUS

FIELD OF THE INVENTION

This invention relates to a liquid crystal display apparatus, and particularly to a liquid crystal display apparatus having an in-plane switching mode in which transmission and shielding of light is controlled by applying lateral electric field to a substrate to liquid crystal molecules aligned in parallel to a substrate to improve its viewing angle characteristic of black representation and low luminance levels.

BACKGROUND OF THE INVENTION

Liquid crystal displays to which electrostatic fields are applied in parallel to the substrate are known as a lateral electrostatic field method or an IPS (in-plane switching mode). U.S. Pat. No. 6,762,814 and Japanese laid-open patent application publication No. 9-80424 disclose such systems using teeth electrodes. In this system, liquid crystal molecules mainly rotate within a plane in parallel to a substrate, so that it is well known that a change in a double refraction rate is small between application and non-application of electrostatic fields.

However, in the IPS mode, though the variation in the birefringence of the liquid crystal itself is low, it is known that light leaks when viewed at an oblique angle deviating from an absorbing axis of a polarizing plate due to a characteristic of the polarizing plate. To reduce the light leakage in the inclined viewing direction, a system using a retardation compensation plate is disclosed in Japanese laid-open patent application publication No. 2001-350022. However, this document discloses improvement of viewing angles only in the polarizing plates, the document considers the effect of liquid crystal in a VA (Vertically Aligned) mode, but does not discloses compensating the effect of the liquid crystal layer in the IPS mode. Further, the polarizing plate generally uses plates made of TAC (triacetylcellulose) on both sides of the polarizing layer for supporting. However, this document does not disclose retardation compensation in consideration of behavior of the liquid crystal layer due to a retardation difference in the thickness direction of the supporting plates.

Further, Japanese patent No. 3204182 discloses means for resolving a problem that color shift at white portions occurring in accordance with a viewing direction. However, it does not disclose improvement in a displaying characteristic of black representation.

Further, Japanese patent No. 2982869 discloses a structure in which a retardation compensation plate is arranged on an inside of only one polarizing plate to improve a viewing angle characteristic of the black representation. This system considers the effect of the supporting palates of TAC arranged on the both sides of the polarizing plate. However, our study shows that retardation compensation with only one retardation compensation plate cannot provide sufficient decrease in luminance at black-representation condition at an inclined viewing angle as well as cannot reduce the color shift due to wavelength dispersion in the liquid crystal layer. Further, this document does not disclose a difference in the retardation compensation depending on whether the alignment axis (slow axis) of the liquid crystal molecules at the black-representation condition is in parallel or perpendicular to an absorbing axis of the polarizing plate on an incident side, which is a feature of the present invention. This document only discloses, in embodiments, a structure in which the alignment axis of liquid crystal molecules is perpendicular to the absorbing axis of the polarizing plate on the incident side. Further, our study shows there is a problem in the conventional retardation compensation system using only one retardation compensation plate on one side of polarizing plate, so that the color shift occurs in accordance with a viewing orientation.

Further, Japanese laid-open patent application publication No. 2001-290149 discloses thicknesses of RGB color filters and a retardation compensation film.

SUMMARY OF THE INVENTION

This invention is provided to resolve the problem in the liquid crystal display apparatus having the in-plane switching (ISP) mode for controlling transmission and shielding of light by applying electric fields in a lateral direction to the liquid crystal molecules aligned in the direction in parallel to reduce increase in luminance and a color shift in the black-representation condition at an inclined viewing angle.

In the liquid crystal display apparatus including the IPS mode comprises liquid crystal molecules having homogeneous alignment in the horizontal direction, two polarizing plates arranged such that absorbing axes are arranged vertically and horizontally with respect to the screen to have perpendicular intersection therebetween, respectively. When the screen is viewed at an inclined angle in vertical and horizontal orientation, this arrangement can sufficiently decrease a black-representation luminance, because the absorbing axes of two polarizing plates are perpendicular to each other, so that the homogeneous alignment of the liquid crystal molecules is in parallel to the absorbing axis of one polarizing plate. On the other hand, if the screen is viewed in an azimuth angle of 45°, an angle made by the absorbing axes of two polarizing plates deviates from 90°, so that the transmitted light results in leakage of light. This increases luminance from an ideal luminance at the black-representation area or condition.

According to the present invention, an aspect of the present invention provides a liquid crystal display apparatus in which the supporting plates for supporting polarizing plates have different retardation differences Rh in a thickness direction between the upper side and lower side of the liquid crystal layer. Further, the apparatus may further comprise optical retardation compensation films under and above the liquid crystal layer.

According to a further aspect of the present invention provides a liquid crystal display apparatus comprising: a first substrate on an incident side comprising a first polarizing plate; a second substrate, opposite to the first substrate with respect to the incident side, comprising a second polarizing plate, an absorbing axis of the first polarizing plate being substantially perpendicular to that of the second polarizing plate; a liquid crystal layer between the first and second substrates including liquid crystal molecules aligned in a direction in parallel to the substrates and rotated within a plane in parallel to the first substrate when electric fields are applied to the liquid crystal molecules in a direction in parallel to the first substrate; a group of electrodes comprising pairs of electrodes defining pixels on a near side to the liquid crystal layer of either of the first or second substrate for generating the electric fields to provide active matrix driving; and an illumination unit, wherein each of the first and second polarizing plates comprises supporting plates at both sides thereof, the first and second polarizing plates comprise first and second optical retardation compensation films for compensating polarizing conditions of transmitted polarizing light on sides of the liquid crystal layer, respectively; slow axes of the first and second optical retardation compensation films are substantially in parallel to absorbing axes of the first and second polarizing plates, respectively, a smaller angle between the slow axis and the absorbing axis ranges from 0 to 2 degrees, and a thickness dr1 of the first optical retardation compensation film is different from that of a thickness dr2 of the second optical retardation compensation film.

According to a further aspect of the present invention provides a liquid crystal display apparatus comprising: a first substrate on an incident side comprising a first polarizing plate; a second substrate, opposite to the first substrate with respect to the incident side, comprising a second polarizing plate, an absorbing axis of the first polarizing plate being substantially perpendicular to that of the second polarizing plate; a liquid crystal layer between the first and second substrates including liquid crystal molecules aligned in a direction in parallel to the substrates and rotated within a plane in parallel to the first substrate when electric fields are applied to the liquid crystal molecules in a direction in parallel to the first substrate; a group of electrodes comprising pairs of electrodes defining pixels on a near side to the liquid crystal layer of either of the first or second substrate for generating the electric fields for active matrix driving; and an illumination unit, wherein each of the first and second polarizing plates comprises supporting plates at both sides thereof, the supporting plate on the side of the liquid crystal layer, of the first polarizing plate on the side of the illumination unit has a thickness h1, the supporting plate on the side of the liquid crystal layer, of the second polarizing plate has a thickness h2 that is different from the thickness h1, wherein the supporting plate on the side of the liquid crystal layer, of the first polarizing plate has retardation R1·h1, and the supporting plate on the side of the liquid crystal layer, of the second polarizing plate has retardation R2·h2, and wherein in an O-mode when the absorbing axis of the first polarizing plate is substantially in parallel to an alignment direction of the liquid crystal molecules in the absence of application of the electric fields, a smaller angle between the absorbing axis of the first polarizing plate and the alignment direction of the liquid crystal molecules ranging from 0 to 2 degrees, retardation R1·h1>R2·h2, in an E-mode when the absorbing axis of the first polarizing plate is substantially perpendicular to an alignment direction of the liquid crystal molecules in the absence of application of the electric fields, a smaller angle between the absorbing axis of the first polarizing plate substantially ranging from 88 to 90 degrees, R1·h1<R2·h2.

BRIEF DESCRIPTION OF THE DRAWINGS

The object and features of the present invention will become more readily apparent from the following detailed description taken in conjunction with the accompanying drawings in which:

FIGS. 11A and 11B are Poincare sphere drawings illustrating the liquid crystal display apparatus according to the present invention;

FIGS. 12A and 12B are Poincare sphere drawings illustrating the liquid crystal display apparatus according to the present invention;

FIGS. 29A and 29B are Poincare sphere drawings illustrating an embodiment of the liquid crystal display apparatus according to the present invention;

FIG. 30 is a graphical drawing illustrating characteristics of an embodiment of the liquid crystal display apparatus according to the present invention.

FIGS. 31A and 31B are Poincare sphere drawings illustrating an embodiment of the liquid crystal display apparatus according to the present invention;

FIGS. 32A and 32B are Poincare sphere drawings illustrating an embodiment of the liquid crystal display apparatus according to the present invention;

FIGS. 35A and 35B are Poincare sphere drawings of an embodiment of the liquid crystal display apparatus according to the present invention;

The same or corresponding elements or parts are designated with like references throughout the drawings.

DETAILED DESCRIPTION OF THE INVENTION

In liquid crystal displays emitting no light themselves, it is important how to transmit light from an illumination unit at a white-representation and shielding the light at a black-representation. The present invention is related to a technique to decrease in luminance and eliminates a color shift condition at black-representation (shadow) areas.

Figure 7:
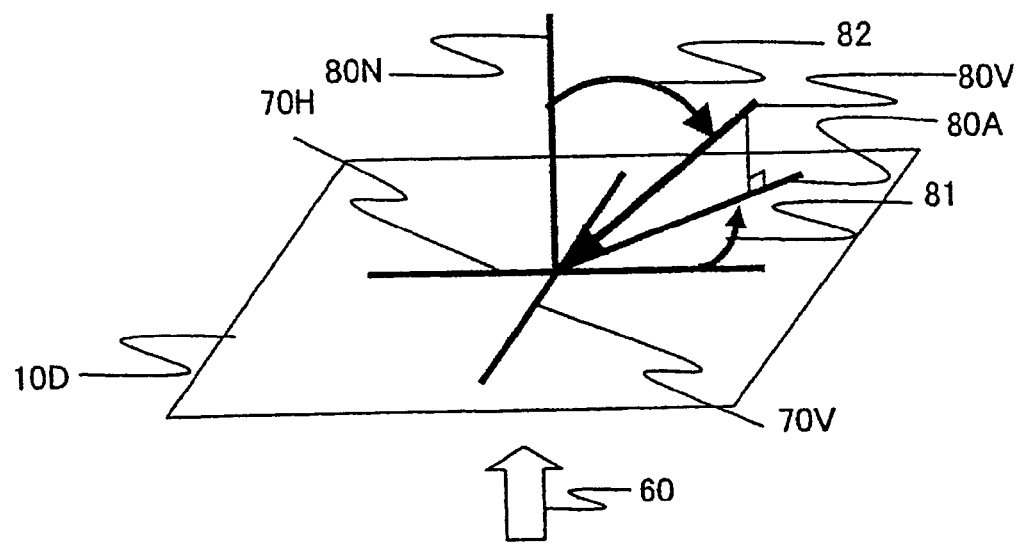
FIG. 7 is an illustration describing definitions for illustrating the present invention.

Prior to describing why the increase in luminance and the color shift at dark areas occurs, definition will be described with reference to FIG. 7. It is assumed that light 60 from an illumination unit (not shown) is incident on a liquid crystal display which modulates the light 60 and transmits modified light from a display plane 10D. Further it is assumed that regarding the display plane 10D, a normal direction 80N, a left and right (horizontal) direction 70H, and an upward-downward direction are defined. When a viewing direction 80V is taken, a viewing angle 82 made with the normal direction 80N on the display plane 10D is θ, and with assumption that a shadow of the viewing direction 80V is 80A, its angle with the horizontal direction 70H is defined as an azimuth angle 81 designated with Φ.

Figure 9A:
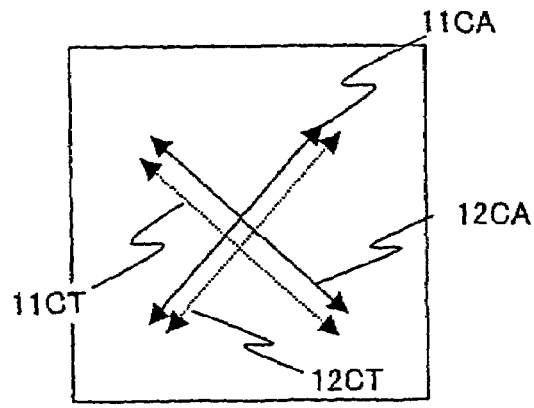
FIGS. 9A and 9B are illustrations of an embodiment of the liquid crystal display apparatus according to the present invention.
Figure 9B:
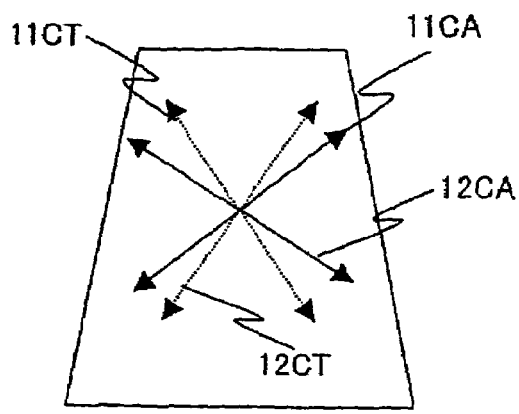

Next, the reason of leakage of light will be described in a condition that, in a pair of first and second polarizing plates 12 and 11 of which absorbing axis are perpendicular to each other (having a perpendicular relation), a viewing angle θ is θ≠0°, Φ≠0°, 180°±90°. As shown in FIG. 9A, if two polarizing plates 11 and 12 are positioned so as to make an absorbing axes 11CA and 12CA of the polarizing plates 11 and 12 intersect at a right angle with each other (transmitting axes are 11CT and 12CT), light entering there in the normal direction of the first and second polarizing plates 12 and 11 becomes linear polarizing light, which is absorbed by the second polarizing plate 11 on the output side, which provides a black-representation. On the other hand, as shown in FIG. 9B, when the display is viewed in an oblique angle (θ≠0°, Φ≠0°, 180°±90°), light transmitted through the incident side (first) polarizing plate 12 includes components in parallel to the transmission axis of the output side of polarizing plate 11, so that the output side (second) polarizing plate 11 cannot completely shield the light, which results in leakage of light at black-representation.

Further, in the case that a liquid crystal layer having a parallel alignment is provided between first and second polarizing plates 12 and 11 having a perpendicular relation, if the alignment axis of the liquid crystal layer is in parallel to the absorbing axis of the incident side polarizing plate 12, there is no effect of the liquid crystal layer. However, we have discovered that if the alignment axis of the liquid crystal layer deviates or if the perpendicular relation of two polarizing plates 11 and 12 deviates, there is effect of liquid crystal layer.

Figure 8:
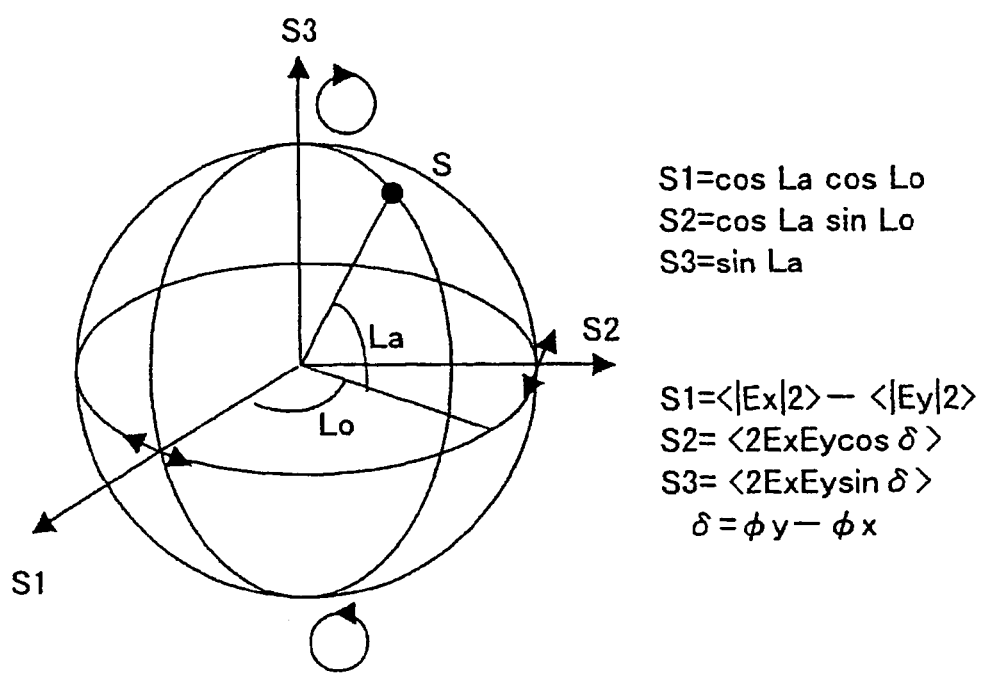
FIG. 8 is a Poincare sphere drawing illustrating the liquid crystal display apparatus according to an embodiment of the present invention.

To clearly understand polarizing conditions, Poincare sphere is introduced. Poincare sphere is disclosed in "Crystal Optics" by Society of Applied Physics Optics (Japan) at Social Meeting Edition, published by Morikita syuppan kabusikigaisha, 1984, a first edition, at fifth chapter, p102 to p163. Regarding stokes parameters S0, S1, S2, and S3, if it is assumed that x and y axes are defined on a plane perpendicular to a traveling direction of light, and thus, their electric amplitudes are defined as Ex and Ey, and a relative phase difference between Ex and Ey is δ(=δy−δx), $S0=<|Ex|^2>+<|Ey|^2>$ $S1=<|Ex|^2>-<|Ey|^2>$ $S2=<2ExEy \cos δ>$ $S2=<2ExEy \sin δ>$ In the case of a perfect polarization, $S0^2=S1^2+S2^2+S3^2$. When this is represented on Poincare sphere, the result is shown in FIG. 8. More specifically, S1, S2, and S3 axes are defined in a spatial rectangular coordinate system, a point S indicative of a polarizing condition locates on a sphere having a radial representing intensity S0. It is assumed that a point is given on the sphere for a polarizing condition S which is indicated with a latitude La and a longitude Lo. In the case of the perfect polarizing condition, since $S0^2=S1^2+S2^2+S3^2$, the radius is considered as 1, the following relation is given:

$S1=\cos La \cos Lo$ $S2=\cos La \sin Lo$ $S3=\cos La$

Here, on Poincare sphere, right-handed polarizing light locates at the upper Hemisphere represent; left-hand polarizing light, at the lower Hemisphere; the linear polarizing light, at the equator, right-handed circular polarizing light, at the upper pole; and left-handed circular polarizing light, at the lower pole.

Figure 10A:
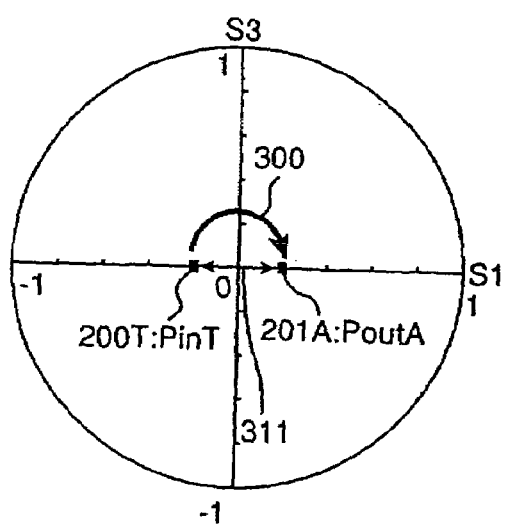
FIGS. 10A and 10B are Poincare sphere drawings illustrating the liquid crystal display apparatus according to the present invention.
Figure 10B:
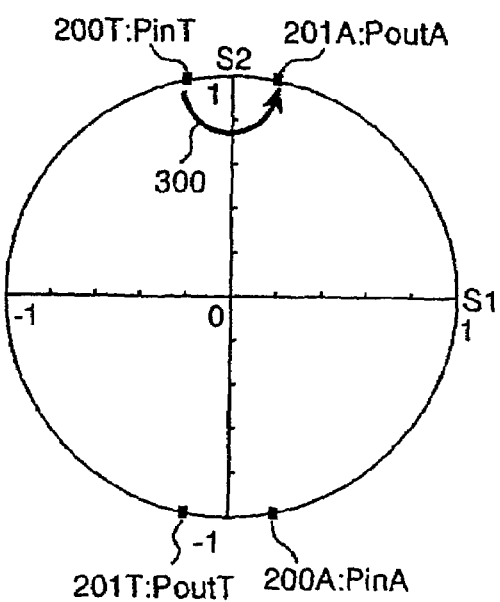

If the condition shown in FIG. 9B is considered on Poincare sphere, this condition is represented in FIGS. 10A and 10B. FIGS. 10A and 10B represent a viewing condition at an orientation Φ=45°, θ=60°, wherein FIG. 10B represents projection on an S1-S2 plane, and FIG. 10A represents projection on an S1-S3 plane. A polarizing condition of the transmission axis 12CT of the incident side polarizing plate 12 is represented by a reference 200T, a linear polarizing light having a polarizing component in the absorbing axis is represented by a reference 200A, the transmission axis 11CT of the output side is represented by a reference 201T, and linear polarizing light having a polarizing component along the absorbing axis 11CA is represented by a reference 201A. Thus, it can be seen that a distance 311 between the polarizing conditions 200T and 201A represents light leakage. Accordingly, conversion 300 from the polarizing condition 200T to the polarizing condition 201A eliminates light leakage.

In FIGS. 10A and 10B, only ideal conditions are considered. However, general polarizing plates comprise supporting plates on both sides of the polarizing layer, wherein the supporting plates are generally made of triacetylcellulose (TAC), which shows almost no retardation difference in-plane. However, the TAC has retardation R·h in the thickness direction. It is assumed that indexes of refraction of the supporting plates along the plane are nx and ny, that in the thickness direction is nz, and thickness is h.

$$R·h=((nx+ny)/2-nz)·h$$

Figure 6:
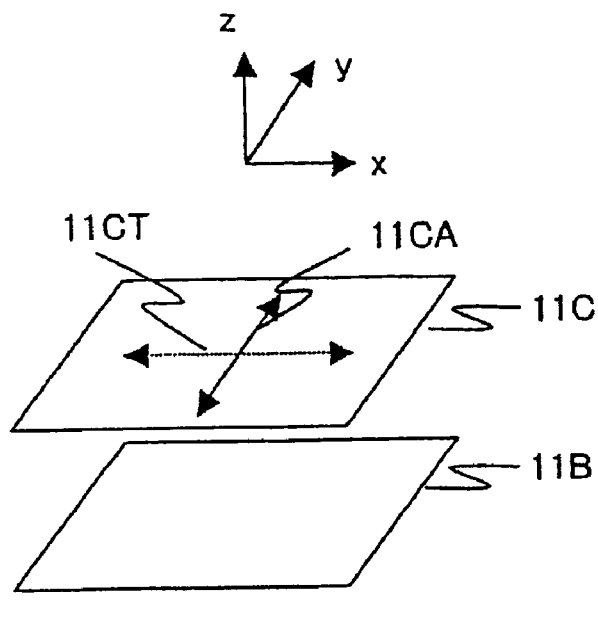
FIG. 6 shows an optical layer structure of the liquid crystal display apparatus according to an embodiment of the present invention.
Figure 6:
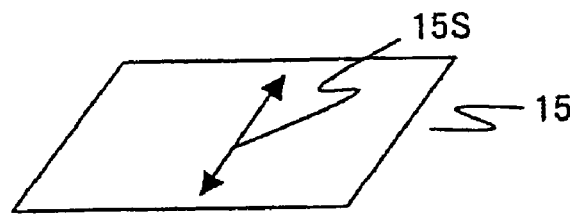
Figure 6:
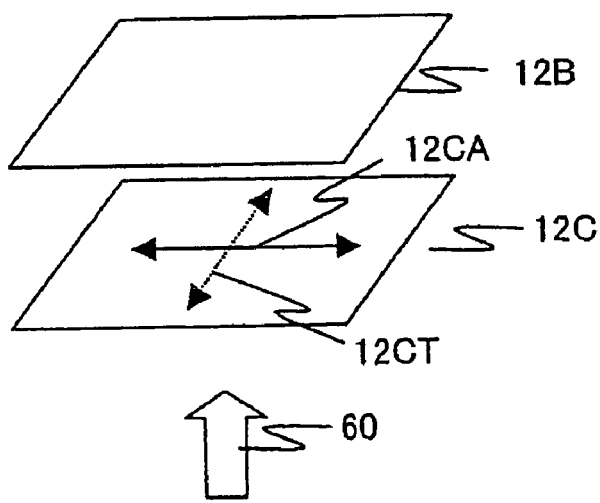

The retardation R·h does not affect the polarizing condition when light is incident perpendicularly on the TAC, but when light is incident slantwise on the TAC, the polarizing condition varies in accordance with the effect of TAC of the supporting member. Here, the polarizing condition is considered regarding an optical structure shown in FIG. 4. On both sides of the liquid crystal layer 15, first and second polarizing plates 12 and 11 are arranged. On the inside surface of the first polarizing plate 12 of the incident side, a supporting plate 12B is arranged and the inside surface (on the side of the liquid crystal layer 15) of the second polarizing plate 11 of the output side, a supporting member 11B is arranged. Here, an alignment axis 15S of the liquid crystal is in parallel to the absorbing axis 12CA of the incident side polarizing plate 12, perpendicular to the transmission axis 12CT, perpendicular to the absorbing axis 11CA of the output side polarizing plate 11, and in parallel with the transmission axis 11CT of the output side polarizing plate 11. This condition is referred to as an O-mode. On the other hand, as shown in FIG. 6, if the upper and lower polarizing plates 11 and 12 have axes perpendicular to each other, that is, the alignment axis 15S of the liquid crystal is perpendicular to the absorbing axis 12CA of the incident side polarizing plate 12, in parallel to the transmission axis 12CT, in parallel to the absorbing axis 11CA of the output side polarizing plate 11, and perpendicular to the transmission axis 11CA of the output side polarizing plate 12. This condition is referred to as the E-mode.

Figure 1:
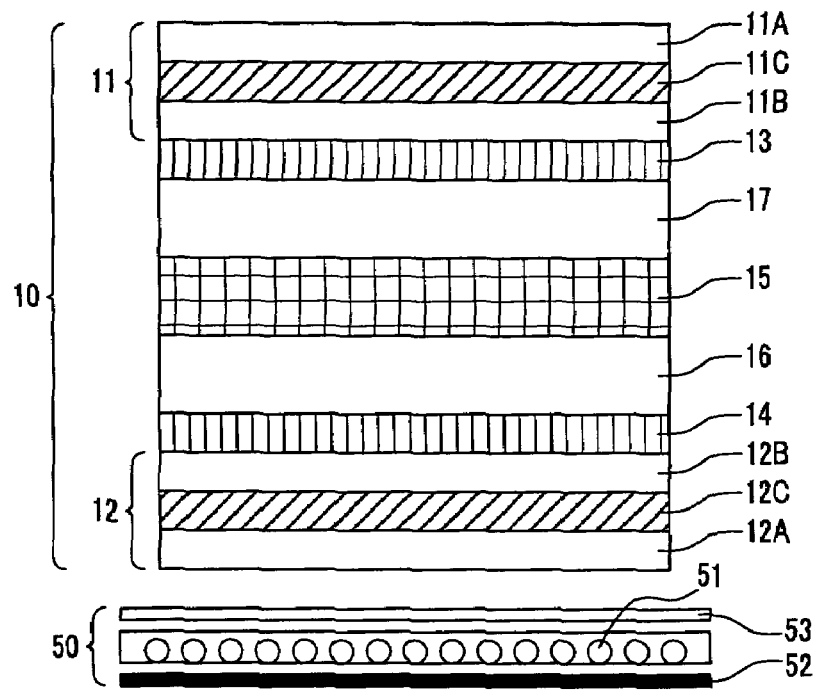
FIG. 1 is a cross-sectional view of a liquid crystal display apparatus according to an embodiment of the present invention.
Figure 2:
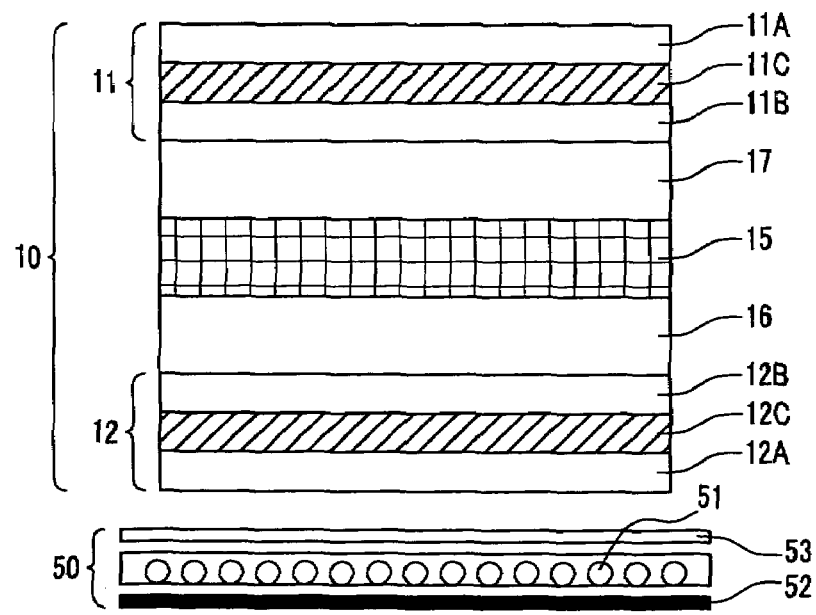
FIG. 2 is a cross-sectional view of the liquid crystal display apparatus according to an embodiment of the present invention.

Further, outside the polarizing layers 11C and 12C, generally supporting member (supporting plates) 11A and 12A are arranged as shown in FIGS. 1 and 2. However, because they are unnecessary in considering the polarizing condition, they are omitted in FIG. 6.

Figure 4:
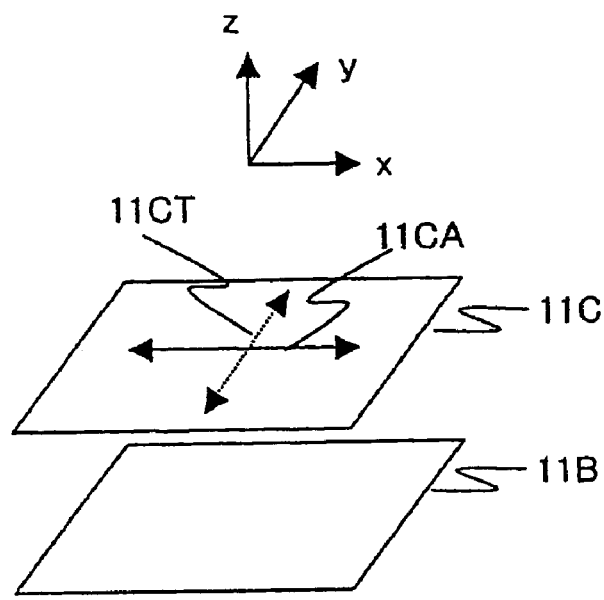
FIG. 4 shows an optical layer structure of the liquid crystal display apparatus according to an embodiment of the present invention.
Figure 4:
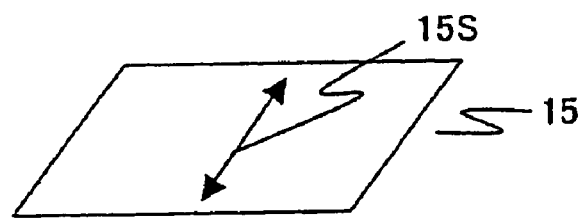
Figure 4:
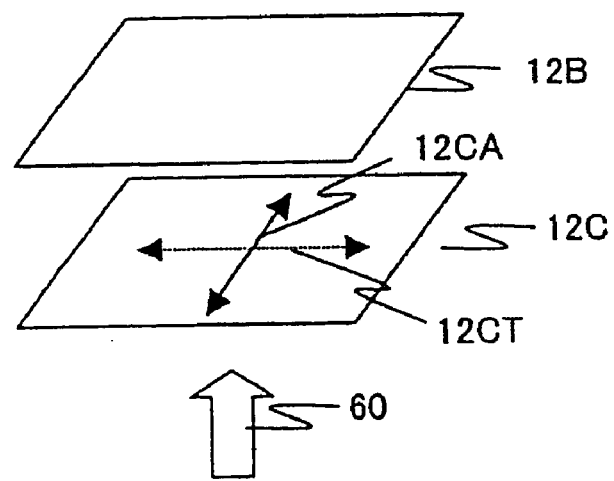

Regarding the structure shown in FIG. 4, variation of a polarizing condition will be considered with FIG. 11A.

Here, it is assumed that a refractive index anisotropy is ΔnLC, the gap is dLC, and the product of ΔnLC·dLC is referred to as retardation. Further, unless specified, respective physical properties are provided with respect to light having a wavelength of 550 nm. Consider light viewed at an azimuth angle Φ=45°, a viewing angle θ=60° similarly to FIG. 10, a polarizing condition of the light transmitted through the polarizing layer 12C having transmission axis 12CT is a reference 200T, which is rotated clockwise by an amount of the retardation R1·h1 due to the retardation R1·h1 when the S1 axis is viewed from "−1" side, so that it is converted into the left-handed elliptical polarization represented by a reference 202. Further, the presence of the liquid crystal layer 15 provides clockwise rotation 301 by retardation ΔnLC·dLC of the liquid crystal layer 15 around the point of a polarizing condition 200T to provide conversion to the right-handed elliptically polarization.

Further, retardation R2·h2 of the supporting member 11B for the output side polarizing plate 11 rotates the polarizing condition clockwise when viewed from "−1" side of S1 axis by an amount of the retardation R2·h2 of the supporting member 11B to convert the polarization into the lift-handed elliptically polarization, i.e., a polarizing condition 204.

Here, the polarizing condition 201A agreeing with the absorbing axis 11CA of the polarizing layer 11c on the output side is 201A, so that light leaks by a distance 310 between the polarizing conditions 204 and 201A.

Further, in FIG. 11A, consideration is made with light having wavelength of 550 nm. However, since the structure shown in FIG. 4 deals with a visible range of 380 nm to 780 nm, in FIG. 11B, consideration is made with light containing wavelength of from 440 nm to 700 nm which is approximately equivalent to the visible range. Thus, similarly to FIG. 10, consider light viewed at the azimuth angle Φ=45°, the viewing angle θ=60°, a polarizing condition of the light transmitted through the polarizing layer 12C having transmission axis 12CT denoted with a reference 200T, which is rotated due to the retardation R1·h1 by an amount of the retardation R1·h1 clockwise when the S1 axis is viewed from "−1" side, so that the polarizing condition is converted into a polarizing condition 212 that is right-handed elliptical polarization. Here, a length of straight line of the polarizing condition 212 indicates that the polarizing condition is converted into different polarizing conditions in accordance with wavelength because retardation varies in accordance with wavelength.

Further, the liquid crystal layer 15 rotates the polarizing condition clockwise around the point of the polarizing condition 200T by an amount of retardation ΔnLC·dLC, so that the polarizing condition is converted into a polarizing condition 213 of elliptical polarization extending in accordance with wavelength. As shown in FIG. 11B, at short wavelengths, the polarizing condition is the left-handed elliptical polarization, and at long wavelengths, the polarizing condition is the right-handed elliptical polarization.

Further, retardation R1·h2 of the supporting member 11B of the output side polarizing plate 11 rotates the polarizing condition by an amount of the retardation R2·h2 clockwise when viewed from "−1" side of the S1 axis, so that the polarizing condition is converted into the elliptical polarization as the polarizing condition 214. Here, a polarizing condition agreeing with the absorbing axis 11CA of the polarizing layer 11C on the output side is a polarizing condition 201A, so that it is understood that light is leaked by distances between the polarizing conditions 214 and 201A and that an amount of leaked light varies in accordance with wavelength. Accordingly, this explains the fact that a black-representation area is colored when it is seen at an inclined angle.

Next, this invention is described with reference to FIGS. 12A, 12B, 13A and 13B. FIG. 2 shows a structure of a crystal display apparatus according to the present invention. A first substrate 16 comprising a first polarizing plate 12 on the incident side having an absorbing axis and a second substrate 17 comprising the other second polarizing plate 11 having another absorbing axis are arranged such that these absorbing axes are perpendicular to each other, wherein a smaller angle inclusively ranging between these axes is from 88° to 90°. Liquid crystal molecules of the liquid crystal layer 15 are aligned in parallel to the substrates 17 and 16. The liquid crystal layer 15 is sandwiched between the first and second substrates 17 and 16, wherein when an electric field is applied to the liquid crystal molecules of the liquid crystal layer 15 in a direction in parallel to the first substrate 16, the liquid crystal molecules rotates (twists) within the plane in parallel to the first substrate 16.

Further, a group of electrodes having pairs of electrodes defining pixels are arranged on a near side to the liquid crystal layer of either of the first or second substrate 16 or 17 for active matrix driving. Further, on a back face of the display plane 10 an illumination unit 50 is arranged. In the structure shown in FIG. 2, its optical structure is shown in FIG. 4.

In FIG. 12A, consider light viewed at the azimuth angle Φ=45°, the viewing angle θ=60°, a polarizing condition transmitted through transmission axes 12CT of the polarizing layer 12C is 200T, which is rotated by an amount of the retardation R1·h1 clockwise due to the retardation R1·h1 of the supporting member 12B when the S1 axis is viewed from "−1" side, so that the polarizing condition is converted into the left-handed elliptical polarization, i.e., a polarizing condition 242. Further, the presence of the liquid crystal layer 15 provides rotation 341 by retardation ΔnLC·dLC of the liquid crystal layer 15 clockwise around the point of the polarizing condition 200T to convert the polarizing condition into the right-handed elliptically polarization, i.e., a polarizing condition 243.

Further, retardation R1·h2 of the supporting member 11B for the output side polarizing plate 11 rotates the polarizing condition clockwise when viewed from "−1" side of S1 axis by the amount of the retardation R2·h2 of the supporting member 11B to convert the polarization into the right-handed elliptically polarization, i.e., a polarizing condition 244.

Here, the polarizing condition agreeing with the absorbing axis 11CA of the polarizing layer 11C on the output side is 201A, so that light leaks by a distance 312 between the polarizing conditions 244 and 201A.

Here, in the O-mode in FIG. 4, in comparison with FIGS. 11A and 11B, it can be seen that increase in the retardation R1·h1 of the supporting member 12B on the side of incident light and decrease in the retardation R2·h2 of the supporting member 11B on the side of output light can reduce the light leakage 312.

Further, as shown in FIG. 12B, when the retardation ΔnLC·dLC of the liquid crystal layer 15 is increased to provide R1·h1>R2·h2, the polarizing condition, subject to variation 351 in polarizing condition due to the liquid crystal layer 15, changes from the polarizing conditions 200T, 252, 253, to 254, so that light leakage can be reduced.

Figure 13A:
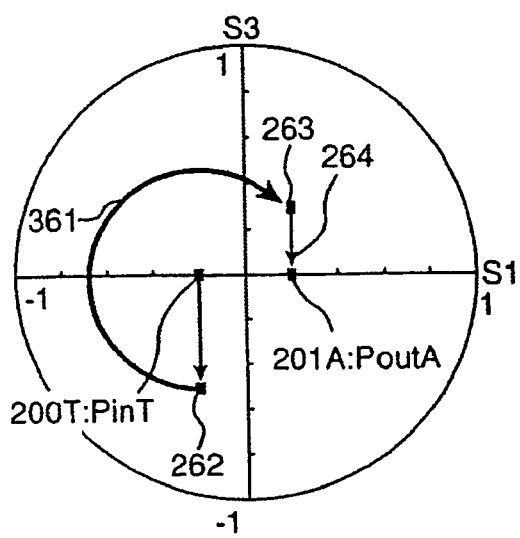
FIGS. 13A and 13B are Poincare sphere drawings illustrating the liquid crystal display apparatus according to the present invention.

Further, preferably, as shown in FIG. 13A, if the retardation ΔnLC·dLC of the liquid crystal layer 15 is increased, and an optimum relation of R1·h1>R2·h2 is selected in accordance with the retardation ΔnLC·dLC, the polarizing condition, subject to the polarizing condition change 361, changes from the polarizing conditions 200T, 262, 263, to 264, so that light leakage can be reduced or eliminated.

Figure 13B:
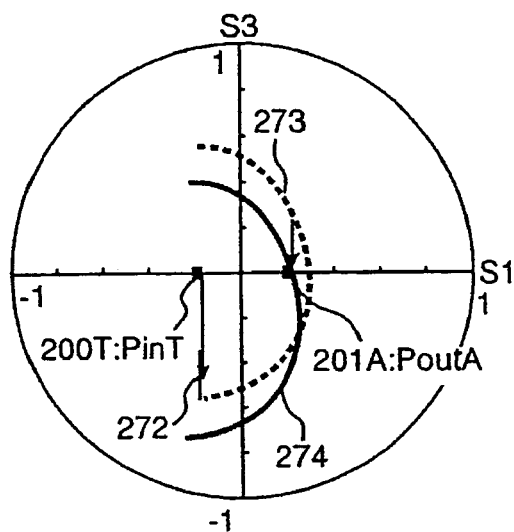

Next, regarding the structure shown in FIG. 4 wavelength dependency of light in the approximate visual light having wavelength ranging from 400 nm to 700 nm is considered with reference to FIG. 13B. The light viewed at the azimuth angle Φ=45°, the field of angle θ=60° is considered. The polarizing condition transmitted through transmission axes 12CT of the polarizing layer 12C is represented by a reference 200T, which is rotated by an amount of the retardation R1·h1 of the supporting member 12B clockwise due to the retardation R1·h1 when the S1 axis is viewed from "−1" side, so that the polarizing condition is converted into the left-handed elliptical polarization, i.e., a polarizing condition 272. Here, the length of the straight line of polarizing condition 272 indicates a polarizing condition varying in accordance with wavelength because of variation of retardation with wavelength. Further, the presence of the liquid crystal layer 15 provides rotation 341 by retardation ΔnLC·dLC of the liquid crystal layer 15 clockwise around the point of the polarizing condition 200T by retardation ΔnLC·dLC of the liquid crystal layer to convert the polarizing condition into the right-handed elliptically polarization, i.e., a polarizing condition 273.

As shown in FIG. 13B, at short wavelengths, the polarizing condition is the left-handed elliptical polarization, and at long wavelengths, the polarizing condition is the right-handed elliptical polarization. Further, the retardation of the supporting member 11B for the output side polarizing plate 11 rotates clockwise when viewed from "−1" side of S1 axis by the amount of the retardation R2·h2 of the supporting member 11B to convert the polarization into the right-handed elliptically polarization, i.e., a polarizing condition 274.

Here, the polarizing condition agreeing with the absorbing axis 11CA of the polarizing layer 11C on the output side is represented by a reference 201A, so that light leaks by a difference between the polarizing conditions 274 and 201A. However, if the retardation ΔnLC·dLC of the liquid crystal layer 15 is increased to obtain an optimum relation of R1·h1>R2·h2 in accordance with the retardation ΔnLC·dLC, light leakage at a wavelength can be eliminated or reduced and light leakage at other wavelengths can be reduced in accordance with the reduction, so that the total light leakage can be considerably reduced.

Further, to vary retardation ΔnLC·dLC at red, green, and blue pixels, the cell gaps dR, dG, and dB of the liquid crystal layer 15 are set to have a relation of dR>dG>dB, so that variation of the polarizing condition 273 in wavelength ranging 400 nm to 700 nm can be reduced (in comparison with FIG. 14), so that it can be understood that the light leakage as well as the color shift can be reduced considerably.

Similar consideration is made with respect to the E-mode shown in FIG. 6. The result shows that application of the relation in retardation between the supporting members 12B and 11B in the E-mode provides improvement in the viewing angle characteristic.

A first substrate 16 comprising a first polarizing plate 12 on the incident side having an absorbing axis and a second substrate 17 comprising the other second polarizing plate having another absorbing axis are arranged such that these absorbing axes are perpendicular to each other, wherein a smaller angle between these axes ranges from 88° to 90°. The liquid crystal molecules of the liquid crystal layer 15 are aligned in parallel to the substrates 17 and 16. The liquid crystal layer 15 is sandwiched between the first and second substrates 17 and 16, wherein when an electric field is applied to the liquid crystal molecules of the liquid crystal layer 15 in a direction in parallel to the first substrate 16, the liquid crystal molecules rotates within the plane in parallel to the first substrate 16.

Further, a group of electrodes having pairs of electrodes defining pixels are arranged on a near side to the liquid crystal layer of either of the first or second substrate 16 or 17 for active matrix driving. Further, on a back face of the display plane 10 an illumination unit 50 is arranged.

The first and second polarizing plates 12 and 11 have supporting members at a least one side of the polarizing layer or both sides of the polarizing layer, wherein in the O-mode when the absorbing axis of the first polarizing plate 12 is substantially in parallel to an alignment direction of the liquid crystal molecules in the absence of application of the electric field, a smaller angle between the absorbing axis of the first polarizing plate 12 and the alignment direction of the liquid crystal molecules ranging from 0 to 2 degrees, and the retardation is R1·h1>R2·h2, in the E-mode when the absorbing axis of the first polarizing plate 12 is substantially perpendicular to an alignment direction of the liquid crystal molecules in the absence of application of the electric field, a smaller angle between the absorbing axis of the first polarizing plate 12 ranging from 88 to 90 degrees, the retardation is R1·h1<R2·h2. It has been understood that this condition considerably improves the field of view at black-representation area.

Further, if the supporting members 12B and 11B use the same material, refraction indexes $n_{x12B}=n_{x11B}$, $n_{y12B}=n_{y11B}$, and $n_{z12B}=n_{z11B}$ of the supporting members are substantially the same. If it is assumed that the supporting members have thicknesses h1 and h2, the first and second polarizing plates 12 and 11 have supporting members 12A, 12B, 11A, and 11B at a least one side of the polarizing layer or both sides of the polarizing layer, wherein in the O-mode when the absorbing axis of the first polarizing plate 12 is substantially in parallel to an alignment direction of the liquid crystal molecules in the absence of application of the electric field, a smaller angle between the absorbing axis of the first polarizing plate 12 and the alignment direction of the liquid crystal molecules ranging from 0 to 2 degrees, h1>h2, in the E-mode when the absorbing axis of the first polarizing plate 12 is substantially perpendicular to an alignment direction of the liquid crystal molecules in the absence of application of the electric field, a smaller angle between the absorbing axis of the first polarizing plate 12 and the alignment direction of the liquid crystal molecules ranging from 88 to 90 degrees, h1<h2. It has been proved that this condition considerably improves the field of view at black-representation area.

Further, will be described the present invention which improves the field of view angle by applying an optical retardation compensation film when retardation exits in the thickness direction in the supporting members on the polarizing plates 11 and 12.

FIG. 1 shows a structure of the liquid crystal display according to the present invention. The liquid crystal display apparatus according to the present invention comprises first and second polarizing plates 12 and 11. Each of the first and second polarizing plates 12 and 11 comprises supporting plates at both sides their polarizing layers. The first and second polarizing plates 12 and 11 comprise first and second optical retardation compensation films 14 and 13 for compensating polarizing conditions of transmitted polarizing light on sides of the liquid crystal layer, respectively. Slow axes of the first and second optical retardation compensation films 14 and 13 are substantially in parallel to absorbing axes of the first and second polarizing plates 12 and 11, respectively, wherein a smaller angle between the slow axis and the absorbing axis ranges from 0 to 2 degrees. A thickness dr1 of the first optical retardation compensation film 14 is different from that of a thickness dr2 of the second optical retardation compensation film 13. In the O-mode, when the absorbing axis of the first polarizing plate 12 is substantially in parallel to an alignment direction of the liquid crystal molecules in the absence of application of the electric field, and a smaller angle between the absorbing axis of the first polarizing plate 12 substantially ranges from 0 to 2 degrees, retardation Δnr1·dr1 within a plane of the first optical retardation compensation film 14 and retardation Δnr2·dr2 within a plane of the second optical retardation compensation film 13 have a relation of 0 nm<Δnr1·dr1<Δnr2·dr2 or 5 nm<Δnr1·dr1<Δnr2·dr2.

Here, if it is assumed that refraction indexes within the optical retardation compensation films are nx and ny, and a refraction index in a thickness direction is nz, its thickness is dr, and a slow axis within the plane is x axis, retardation within the plane Δnr·dr and Nz coefficient are given by Equations 4 and 5, respectively.

$$\Delta nr \cdot dr1 = (nx - ny) \cdot dr \quad (4)$$

$$Nz = (nx - nz)/(nx - ny) \quad (5)$$

Further, an optical retardation compensation film having an optical axis of an extraordinary ray within the film plane is referred to as an a-plate and an optical retardation compensation film having an optical axis of an extraordinary ray in a vertical direction of the film plane is referred to as a c-plate. Further, one having a refraction index of the ordinal ray higher than that of the extraordinary ray is referred to as a positive one, and one having a refraction index of the ordinal ray lower than that of the extraordinary ray is referred to as a negative one. More specifically, Nz=0 corresponds to a negative a-plate, Nz=1 corresponds to a positive a-plate, Nz=∞ corresponds to a negative c-plate, and Nz=−∞ corresponds to a positive c-plate.

Figure 3:
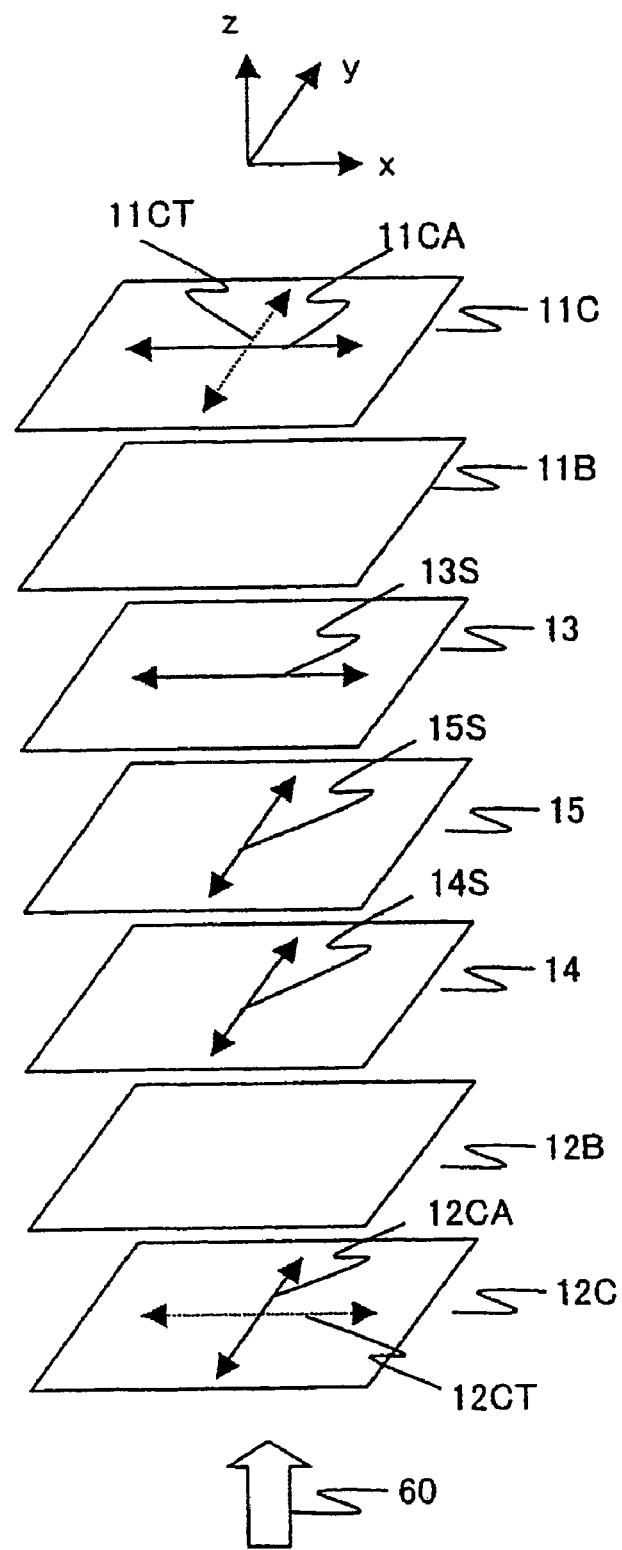
FIG. 3 shows an optical layer structure of the liquid crystal display apparatus according to an embodiment of the present invention.

Here, FIG. 3 shows an optical layer structure of the structure shown in FIG. 1. On the both sides of the liquid crystal layer 15, the polarizing plates 11 and 12 are arranged, and between the first and second polarizing plate 12 and 11, the supporting member 12B and the supporting member 11B are arranged on the side of the first and second polarizing plates 12 and 11, respectively, wherein further insides of thereof, a first optical retardation compensation film 14 and a second optical retardation compensation film 13 are arranged on the side of the first and second polarizing plates 12 and 11, respectively.

Here, the alignment axis 15S of the liquid crystal is in parallel to the absorbing axis 12CA of the incident side polarizing plate 12, and perpendicular to the transmission axis 12CT, perpendicular to the absorbing axis 11Ca of the output side polarizing plate 11, and in parallel to the transmission axis 11CT of the output side polarizing plate 11. This condition is referred to as the O-mode.

Figure 5:
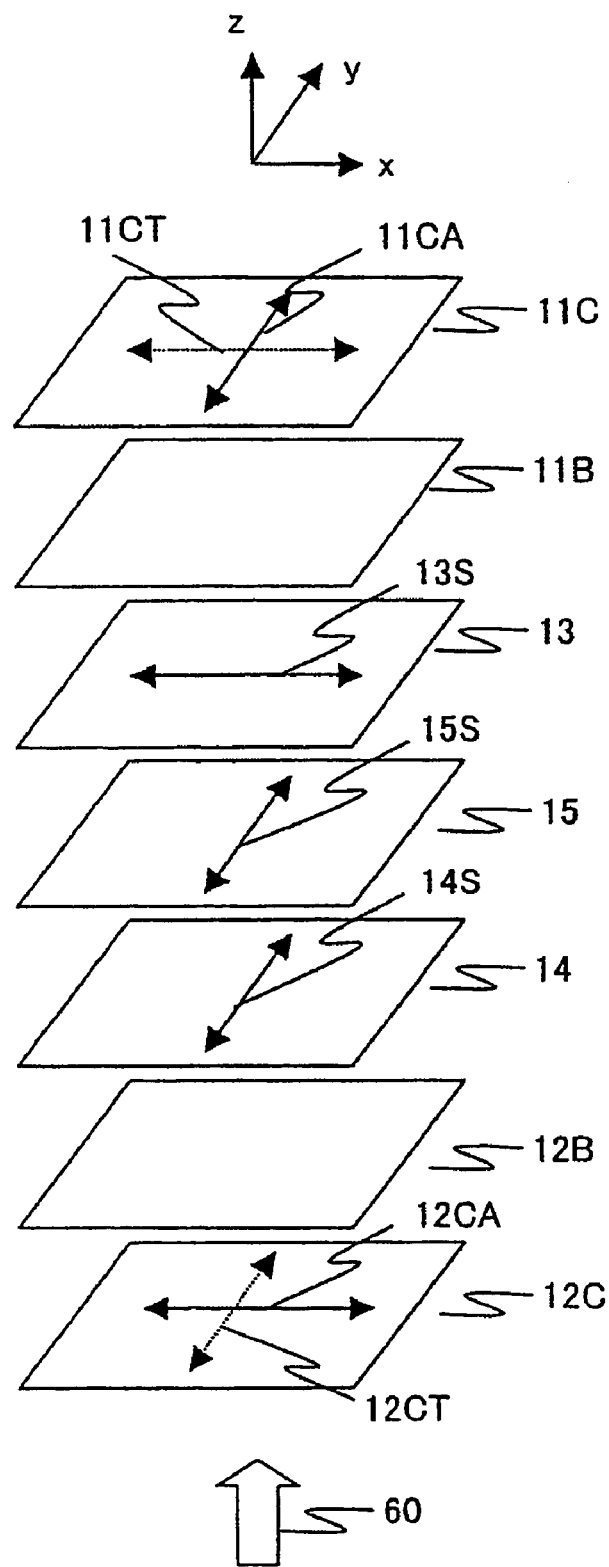
FIG. 5 shows an optical layer structure of the liquid crystal display apparatus according to an embodiment of the present invention.

On the other hand, as shown in FIG. 5, if the absorbing axes of upper and lower polarizing plates 1 and 12 have a rotated relation of 90°, that is, the alignment axis 15S of the liquid crystal is perpendicular to the absorbing axis 12CA of the incident side polarizing plate 12, and in parallel to the transmission axis 12CT, in parallel to the absorbing axis 11CA of the output side polarizing plate 11, and perpendicular to the transmission axis 11CT of the output side polarizing plate 11. This condition is referred to as the E-mode.

Generally, outside of the polarizing layers 11C and 12C, as shown in FIG. 1, supporting members 11A and 12A are arranged, but they are omitted in the drawing because they are not essential in consideration of polarizing conditions. Further, slow axes 14S and 13S within these optical retardation compensation films 14 and 13 are in parallel to the absorbing axis 12CD and 11CA, respectively. Regarding the structure shown in FIG. 1, i.e., FIG. 3, the polarizing condition is considered with reference to FIG. 14.

Figure 14:
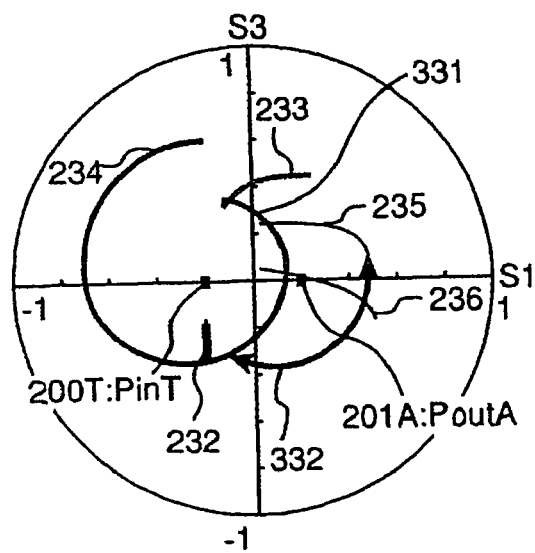
FIG. 14 is a Poincare sphere drawing illustrating an embodiment of the liquid crystal display apparatus according to the present invention.

In FIG. 14, consider a wavelength dependency regarding light ranging from 400 nm to 700 nm, with light viewed at the azimuth angle Φ=45°, the viewing angle θ=60°. Here, it is assumed that for the first optical retardation compensation film 14, Δnr1·dr1=142 nm, and Nz1=0.0, for the second optical retardation compensation film 13, Δnr2·dr2=252 nm, Nz1=0.0.

Incident light at the light viewed at the azimuth angle Φ=45°, the viewing angle θ=60° has a polarizing condition 200T after transmission through the transmission axes 12CT of the polarizing layer. The retardation R1·h1 rotates polarizing of light clockwise when viewed from "−1" side of the S1 axis by an amount of retardation R1·h1, to convert the light into left-handed elliptical polarizing light in a polarizing condition 232. Here, because the length of the polarizing condition 232 indicates that the light is converted in different polarizing conditions in accordance with wavelength because the retardation varies in accordance with the wavelength. Further, because the first optical retardation compensation film 14 has Nz1=0.0 and the slow axis 14S is in parallel to the absorbing axis 12CA of the first polarizing plate 12, the polarizing condition is rotated clockwise around the point of the polarizing condition 201A by an amount of Δnr1·dr1, so that it is converted into a polarizing condition 233 having a broadened wavelength range. Further, the liquid crystal layer 15 rotates the polarizing condition clockwise around the point of the polarizing condition 200T by rotation 331 corresponding to an amount of retardation ΔnLC·dLC, so that the polarizing condition is converted into a polarizing condition 234 of elliptical polarizing light having a wider wavelength range.

Next, to compensate the wavelength dispersion by this liquid crystal layer 15, the second optical retardation compensation film 13 rotates the polarizing condition counterclockwise around the point of the polarizing condition 200T by rotation 332 corresponding to the retardation Δnr2·dr2, because the slow axis 13A is arranged perpendicular to the alignment direction 15S, so that the condition is converted into a polarizing condition 235 having a wider wavelength range. During this, this rotation is opposite to the retardation, so that the wavelength dispersion can be compensated. Further, the retardation R2·h2 of the supporting member 11B on the output side polarizing plate 11 rotates the polarizing condition by an amount of the retardation R2·h2 clockwise when viewed from the side "−1" of the S1 axis to provide a polarizing condition 236 of elliptical polarizing light.

Here, the polarizing condition agreeing with the absorbing axis 11CA of the polarizing layer 11 on the output side is represented by a reference 201A, and thus, distances between the polarizing conditions 236 and 201A represents occurrence of light leakage. However, it has been seen that luminance at a black-representation area at the viewing angle mentioned above can be reduced by making Δnr1·dr1, and Δnr2·dr2 optimum by Δnr1·dr1>Δnr2·dr2 in accordance with the retardation ΔnLC·dLC of the liquid crystal 15.

Figure 15:
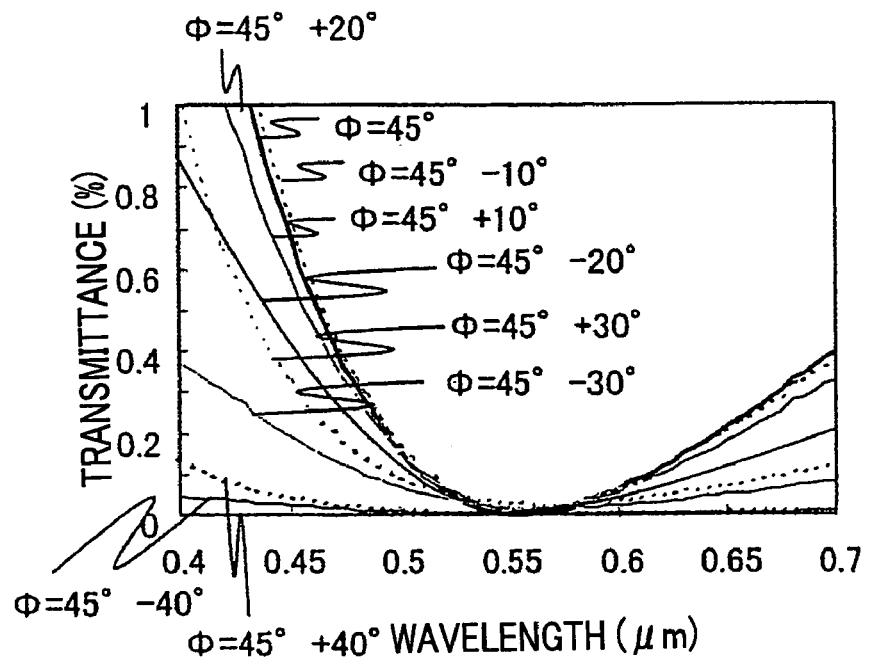
FIG. 15 is a graphical drawing illustrating characteristics of an embodiment of the liquid crystal display apparatus according to the present invention.

Further, the azimuth dependency in that condition is, as shown in FIG. 15, the azimuth angle of 45° shows a largest wavelength dependency with respect to wavelength. However, with respect to deviation from the azimuth angle 45°, approximately symmetrical characteristics can be obtained, which can decrease the azimuth angle of dependency.

Further, similar study was made for the E-mode shown in FIG. 5. The result shows that the viewing angle characteristic regarding luminance and the color shift at a black-representation area at the viewing angle mentioned above can be improved by making ·nr1·dr1 and Δnr2·dr2 optimum by Δnr1·dr1<Δnr2·dr2.

Further, if the first and second optical retardation compensation films 14 and 13 are made of the same material, the refraction indexes nx and ny of the first and second optical retardation compensation films 14 and 13 are approximately the same in accordance with Equation (4). It is assumed that thicknesses of the first and second optical retardation compensation films 14 and 13 are dr1 and dr2. Then, each of the first and second polarizing plates 12 and 11 comprises supporting plates at both sides thereof. The first and second polarizing plates 12 and 11 comprise first and second optical retardation compensation films 14 and 13 for compensating polarizing conditions of transmitted polarizing light on sides of the liquid crystal layer, respectively. The slow axes of the first and second optical retardation compensation films 14 and 13 are substantially in parallel to the absorbing axes of first and second polarizing plates 12 and 11, respectively. A smaller angle between the slow axis and the absorbing axis ranges from 0 to 2 degrees. In the O-mode when the absorbing axis of the first polarizing plate 12 is substantially in parallel to an alignment direction of the liquid crystal molecules in the absence of application of the electric field, a smaller angle between the absorbing axis of the first polarizing plate 12 substantially ranging from 0 to 2 degrees, the thicknesses of the first and second optical retardation compensation films 14 and 13 have a relation of dr1<dr2. In the E-mode when the absorbing axis of the first polarizing plate 12 is substantially perpendicular to an alignment direction of the liquid crystal molecules in the absence of application of the electric field, a smaller angle between the absorbing axis of the first polarizing plate 12 substantially ranges from 88 to 90 degrees, and the thicknesses of the first and second optical retardation compensation films 14 and 13 have a relation of dr1>dr2.

This considerably improves the viewing angle in the black-representation characteristic, so that it has been seen that characteristics in which the luminance increase and the color shift at an inclined viewing angle is reduced.

Further, thicknesses of the supporting members 12A, 12B, 11A, and 11B of the polarizing plates 12 and 11 and the first and second optical compensation films 14 and 13 are about 5 to 500 μm and preferably 20 μm less than 200 μm, respectively.

Hereinbelow, embodiments according to the present invention will be described. This embodiment will be described exemplarily, and thus, this invention is not limited with in the scope of the following embodiments.

These embodiments include results obtained by numerical calculation using optical simulation with the 4×4-Matrix Formulation disclosed in "Optical in Stratified and Anisotropic Media: 4×4-Matrix Formulation" D. W. Berreman, 1972, volume 62, No. 4, P502 to p510.

In the simulation, data of spectral characteristics of a three-wavelength cold-cathode tube, spectral transmission characteristics of R, G, and B color filters, and spectral characteristics of 1224DU manufactured by NITTO DENKO CORPORATION for a polarizing plate/polarizing layer, is used. Further, regarding the wavelength dispersion, the data of Polycarbonate (PC) is used. However, the present invention is not limited by the data.

FIRST EMBODIMENT

FIG. 2 shows a structure of this embodiment and FIG. 4 shows an optical arrangement. In the present invention, the liquid crystal display element 10 comprises as the illumination unit 50 a cold-cathode tube 51, and on a back reflector 52 is arranged, on the side of the liquid crystal display layer, a diffusion plate 53 or the like. The liquid crystal display element 10 further comprises transparent substrates 16 and 17 including first and second polarizing plates 12 and 11, respectively, and a liquid crystal layer 15 having a parallel alignment sandwiched between the substrates 16 and 17. To clearly show a layer structure or an optical structure, wirings, alignment films, thin-film transistors and the like are not shown. However, to provide matrix display, general active device structures are applicable to this structure.

The liquid crystal layer 15 shows a positive dielectric anisotropy, and its optical anisotropy $\Delta nLC=0.0825$. A cell gap dLC of the liquid crystal cell is $dLC=4$ μm. A pre-tilt angle of both plates is 2°. Rubbing directions are, in FIG. 4, in parallel to the alignment direction 15S of the liquid crystal layer 15 and are opposite to each other. $\Delta nLC \cdot dLC$ of the liquid crystal is $\Delta nLC \cdot dLC = 330$ nm$=330/550=0.6$ $\lambda$ (wavelength).

Further, axial directions of the upper and lower polarizing plates 11 and 12, are, as shown in FIG. 4, set to have the O-mode. More specifically, the polarizing transmission axis 12CT of the polarizing layer 12C of the incident side polarizing plate 12 is perpendicular to the polarizing transmission axis 11CT of the polarizing layer 11C of the output side polarizing plate 11, and the liquid crystal alignment axis 15S of the liquid crystal layer 15 is perpendicular to the absorbing axis 12CA of the polarizing layer 12C of the incident side polarizing plate 12.

Here, supporting members 11A, 11B, 12A and 12B for polarizing plates 12 and 11 conventionally used in products are made of TAC and have thickness of about 80 μm. In this condition, a black-representation luminance transmittance (hereinafter referred to as a black-representation transmittance Tb at a viewing angle) was estimated at an azimuth angle $\Phi=45°$ and a viewing angle $\theta=60°$. In other words, a luminance level at a black-representation area viewed at the azimuth angle $\Phi=45°$ and the viewing angle $\theta=60°$ is estimated. The result was 0.9%. Further, in this condition, a white luminance level transmittance in the front thereof is 38%. At the azimuth angle $\Phi=45°$ and the viewing angle $\theta=60°$, the contrast ratio is not greater than 40. Further, it is seen that making the black-representation transmittance Tb not greater than 0.35% provides a good characteristic in which the luminance level at the black-representation area is sufficiently reduced in visibility of a human being. Then, this invention provides a structure such that the black-representation transmittance Tb is set not greater than 0.9%, preferably 0.35%.

When a thickness h1 of the supporting member 12B on the incident side is 160 μm, a thickness h2 of the supporting member 11B on the output side is 80 μm, their retardation $R1 \cdot h1 \approx 110$ nm, $R2 \cdot h2 \approx 55$ nm, the black-representation transmittance Tb at the azimuth angle $\Phi=45°$ and the viewing angle $\theta=60°$ is about 0.35%, so that the black-representation luminance can be reduced considerably.

Further, in the polarizing plates 11 and 12, if the upper and lower supporting members 11A, 11B, 12A, and 12B are different in thickness or characteristic, films may warp themselves. Thus, the supporting members 11A and 11B preferably have the same specification, and the supporting members 12A and 12B preferably have the same specification.

In this embodiment, first and second optical retardation compensation films 14 and 13 are different from each other in retardation $R \cdot h$. However, if $R1 \cdot h1 = R1 \cdot h1 = 55$ nm, a negative a-plate is made for only organic films on one side of substrate such as TFT protection films or alignment films or the like to provide retardation $R \cdot h=55$ nm, the same effect can be obtained. Further if $R1 \cdot h1 = R1 \cdot h1 = 110$ nm, a positive a-plate is made for only organic films on one side of substrate such as a TFT (Thin Film Transistor) protection film or alignment films or the like to provide retardation $R \cdot h=55$ nm, the same effect can be provided. These structures are also included in the above-described structure of $R1 \cdot h1 \neq R2 \cdot h2$.

SECOND EMBODIMENT

In the condition of the first embodiment, the retardation $\Delta nLC \cdot dLC$ is changed to $\Delta nLC \cdot dLC=412$ nm$=0.75\lambda$ (wavelength); the thickness h1 of the supporting member 12, 160 μm; and the thickness h2 of the supporting member 11B on the output side, 0 μm. Then, their retardation $R1 \cdot h1 \approx 110$ nm, $R2 \cdot h2 \approx 0$ nm, and the black-representation transmittance Tb at the azimuth angle $\Phi=45°$ and the viewing angle $\theta=60°$ is about 0.25, so that the black luminance level can be further reduced.

THIRD EMBODIMENT

In the condition of the first embodiment, $\Delta nLC \cdot dLC$ is further changed to $\Delta nLC \cdot dLC=412$ nm$=0.75\lambda$ (wavelength); the thickness h1 of the supporting member 12B, 160 μm; and the thickness h2 of the supporting member 11B on the output side, 40 μm. Then, their retardation $R1 \cdot h1 \approx 110$ nm, $R2 \cdot h2 \approx 38$ nm, and the black-representation transmittance Tb at the azimuth angle $\Phi=45°$ and the viewing angle $\theta=60°$ is about 0.35%, so that the black luminance level can be further reduced.

This will be described with reference to FIG. 12B. If the retardation $R1 \cdot h1$ of the supporting member 12B of the first polarizing plate 12 on the incident side is increased, and the retardation $R2 \cdot h2$ of the supporting member 11B of the first polarizing plate 11 on the output side is made zero, and the retardation of the liquid crystal layer $\Delta nLC \cdot dLC=412$ nm$=0.75\lambda$, the liquid crystal layer 15 rotates the polarizing condition around the point 200T by rotation of $0.75\lambda$. Thus, it can been seen that equalization of a length in axis S2 represented by distances between the point of the polarizing condition 200T and a point 252 rotated by the retardation of $R1 \cdot h1$ to a length in axis S1 represented by distances between 200T and 201A, can reduce the black-representation luminance.

Further, in FIG. 13B, though the wavelength dispersion exists, the setting is made in accordance with wavelength of 550 nm having a high visual characteristic to provide the reduction in the black-representation luminance.

FOURTH EMBODIMENT

In the condition of the first to third embodiments, the liquid crystal is made 275 nm$=0.5$ $\lambda<\Delta nLC \cdot dLC>550$ nm$=1.0$ $\lambda$. Further, a relation between the retardation $R1 \cdot h1$ of the supporting member 12B of the incident side polarizing plate 12 and the retardation $R2 \cdot h2$ of the supporting member 11B of the incident side polarizing plate 11 is made $R1 \cdot h1 > R2 \cdot h2$. This results in that the black-representation transmittance Tb at the azimuth angle $\Phi=45°$ and the viewing angle $\theta=60°$ is not greater than about 0.9%, so that the black-representation luminance can be reduced. Preferably, the liquid crystal is made 330 nm$<\Delta nLC \cdot dLC>490$ nm. Further, a relation between the retardation $R1 \cdot h1$ of the supporting member 12B of the incident side polarizing plate 12 and the retardation R2·h2 of the supporting member 11B of the incident side polarizing plate 11 is made R1·h1>R2·h2. This results in that the black-representation transmittance Tb at the azimuth angle Φ=45° and the viewing angle θ=60° of not greater than about 0.9%, so that the black-representation luminance can be reduced.

Further preferably, R1·h1>50 nm and R2·h2<50 nm makes the black-representation transmittance Tb at the azimuth angle Φ=45° and the viewing angle θ=60° not greater than about 0.35%, so that the black-representation luminance can be reduced.

Further in this embodiment, the tilt angle of the crystal layer 15 is 2°. However, experiment is made with the tilt angle shows that if the tilt angle is not greater than 3°, similar characteristics can be obtained. Thus, it is preferable that an anti-parallel alignment (the rubbing directions are opposite between the upper and lower planes) in which the tilt angle in the liquid crystal layer is made not greater than 3° or a parallel alignment in which the rubbing directions are the same between the upper and lower planes to cancel the tilt angle.

FIFTH EMBODIMENT

FIG. 2 shows a structure of this embodiment and FIG. 6 shows an optical arrangement of this embodiment. The structure of this embodiment is substantially the same as those of the first to forth embodiments. However, an optical alignment of this embodiment is different from that shown in FIG. 4 and, as shown in FIG. 6, regarding axis directions of the upper and lower polarizing plates 11 and 12. More specifically, the polarizing light transmission axis 12CT of the polarizing layer 12C of the incident side polarizing plate 12 is perpendicular to the polarizing light transmission axis 11CT of the polarizing layer 12C of the output side polarizing plate 11, and the liquid crystal alignment axis 15S is perpendicular to the polarizing light transmission axis 12CT of the polarizing layer 12C of the incident side polarizing plate 12 to provide the E-mode.

Regarding physical properties, the liquid crystal layer 15 shows a positive dielectric anisotropy, and its birefringence ΔnLC=0.0825. A cell gap dLC of the liquid crystal cells is dLC=4 μm. A pre-tilt angle is 2°. Rubbing directions are, in FIG. 6, in parallel to the alignment direction 15S of the liquid crystal layer 15 and are opposite to each other. The retardation ΔnLC·dLC of the liquid crystal is ΔnLC·dLC=330 nm=330/550=0.6 λ (wavelength).

Here, supporting members 11A, 11B, 12A and 12B for polarizing plates 11 and 12 conventionally used in products are made of TAC and have thickness of about 80 μm. In this condition, a black-representation transmittance Tb at the viewing angle was estimated at the azimuth angle Φ=45° and a viewing angle θ=60°. The result was 0.9%. Further, in this condition, a white-luminance transmittance in the front thereof is 38%. At the azimuth angle Φ=45° and the viewing angle θ=60°, the contrast ratio is not greater than 40. Further, it is seen that making the black-representation transmittance Tb not greater than 0.35% provides a good characteristic in which black-representation luminance is sufficiently reduced in visibility of the human being. Then, this invention provides a structure such that the black-representation transmittance Tb is set smaller than 0.9%, preferably not grater than 0.35%.

When a thickness h1 of the supporting member 12 is 80 μm, a thickness h2 of the supporting member 11B on the output side is 160 μm, their retardation R1·h1≈55 nm, R2·h2≈110 nm, the black-representation transmittance Tb at the azimuth angle Φ=45° and the viewing angle θ=60° is about 0.35%, so that the black-representation luminance can be reduced considerably.

SIXTH EMBODIMENT

In the conditions defined in the fifth embodiment, a part of these conditions are changed as follows:

The retardation of the liquid crystal is set ΔnLC·dLC=412 nm=0.75λ (wavelength). The thickness h1 of the supporting member 12B on the incident side is 0 μm, and the thickness h2 of the supporting member 11B on the output side is set 160 μm. Then, the retardation R1·h1≈0 nm, and R2·h2≈110 nm. The actual black-representation luminance at the azimuth angle Φ=45° and the viewing angle θ=60° is not greater than 0.25%, so that the actual luminance level at black-representation areas in the field of view can be further reduced.

SEVENTH EMBODIMENT

In the conditions defined in the fifth embodiment, a part of these conditions are changed as follows:

The retardation of the liquid crystal is set ΔnLC·dLC=412 nm=0.75λ (wavelength). The thickness h1 of the supporting member 12B on the incident side is set 40 μm, and the thickness h2 of the supporting member 11B on the output side is set 160 λm. Then, the retardation R1·h1≈38 nm, and R2·h2≈110 nm. The actual black-representation luminance at the azimuth angle Φ=45° and the viewing angle θ=60° is not greater than 0.35%, so that the actual luminance level at black-representation areas in the field of view can be reduced.

EIGHTH EMBODIMENT

In the condition of the fifth to seventh embodiments, the liquid crystal is made 275 nm=0.5 λ<ΔnLC·dLC>550 nm=1.0λ. Further, a relation between the retardation R1·h1 of the supporting member 12B of the incident side polarizing plate 12 and the retardation R2·h2 of the supporting member 11B of the incident side polarizing plate 11 is made R1·h1>R2·h2. This results in that the black-representation transmittance Tb at the azimuth angle Φ=45° and the viewing angle θ=60° is not greater than about 0.45%, so that the black-representation luminance can be reduced.

Preferably, the liquid crystal is made 330 nm<ΔnLC·dLC>490 nm. Further, a relation between the retardation R1·h1 of the supporting member 12B of the incident side polarizing plate 12 and the retardation R2·h2 of the supporting member 11B of the output side polarizing plate 11 is made R1·h1>R2·h2. This results in that the black-representation transmittance Tb at the azimuth angle Φ=45° and the viewing angle θ=60° of not greater than about 0.45%, so that the black-representation is improved.

Further preferably, R1·h1<50 nm and R2·h2>50 nm makes the black-representation transmittance Tb at the azimuth angle Φ=45° and the viewing angle θ=60° not greater than about 0.35%, so that the black-representation luminance can be reduced.

Further in this embodiment, the tilt angle of the crystal layer 15 is 2°. However, experiments were made with the tilt angle shows that if the tilt angle is not greater than 3°, similar characteristics can be obtained. Thus, it is preferable that an anti-parallel alignment (the rubbing directions are opposite between the upper and lower planes) in which the tilt angle in the liquid crystal layer is made not greater than 3° or a parallel alignment in which the rubbing directions are the same between the upper and lower planes to cancel the tilt angle.

NINTH EMBODIMENT

FIG. 1 shows a structure of this embodiment and FIG. 3 shows the optical arrangement of this embodiment. In the present invention, the liquid crystal display element 10 comprises a cold-cathode tube 51 as the illumination unit 50, and on its back reflector 52 is arranged, on the side of the liquid crystal display layer, a diffusion plate 53 or the like. The liquid crystal display element 10 further comprises the transparent substrates 16 and 17 including first and second polarizing plates 12 and 11, respectively, and the liquid crystal layer 15 having the parallel alignment sandwiched between the substrates 16 and 17. To clearly show a layer structure or an optical structure, wirings, alignment films, thin-film transistors and the like are not shown. However, to provide matrix display, general active dice structures are applicable to this structure.

The liquid crystal layer 15 shows a positive dielectric anisotropy, and its optical anisotropy $\Delta nLC=0.0825$. A cell gap dLC of the liquid crystal cells is $dLC=4$ μm. A pre-tilt angle is 2°. Rubbing directions are, in FIG. 3, in parallel to the alignment direction 15S of the liquid crystal layer 15 and are opposite to each other. The retardation $\Delta nLC \cdot dLC$ of the liquid crystal is $\Delta nLC \cdot dLC=330$ nm$=330/550=0.6$ $\lambda$ (wavelength).

Further, axes directions of the upper and lower polarizing plates 11 and 12, are, as shown in FIG. 3, set to have the O-mode. More specifically, the polarizing transmission axis 12CT of the polarizing layer 12C of the incident side polarizing plate 12 is perpendicular to the polarizing light transmission axis 11CT of the polarizing layer 11C of the output side polarizing plate 11. The liquid crystal alignment axis 15S of the liquid crystal layer 15 is perpendicular to the absorbing axis 12CA of the polarizing layer 12C of the incident side polarizing plate 12.

Further, the slow axes 14S and 13S of the optical retardation compensation films 14 and 13 are in parallel to the polarizing layers of these polarizing plates 12 and 11, respectively. More specifically, the slow axis 14S of the incident side optical retardation compensation film 14 is in parallel to the absorbing axis 12CA of the polarizing layer 12C of the incident side polarizing plate 12, and the slow axis 13S of the output side optical retardation compensation film 13 is in parallel to the absorbing axis 11CA of the polarizing layer 11C of the output side polarizing plate 11.

Here, in the absence of the first and second optical retardation compensation films 14 and 13, the black-representation transmittance Tb was estimated at the azimuth angle $\Phi=45°$ and the viewing angle $\theta=60°$. The result was 0.9%. Further, in this condition, a white luminance level transmittance in the front thereof is 38%. At the azimuth angle $\Phi=45°$ and the viewing angle $\theta=60°$, the contrast ratio is not greater than 40. Further, it is seen that making the black-representation transmittance Tb not greater than 0.35% provides a good characteristic in which the black-representation luminance is sufficiently reduced in visibility. Then, this invention provides a structure such that the black-representation transmittance Tb is made smaller than 0.9%, preferably not greater than 0.35%.

In this embodiment, the supporting members 11A, 11B, 12A and 12B for polarizing plates 11 and 12 conventionally used in products are made of TAC and have thickness of about 80 μm. When a thickness h1 of the supporting member 12 is 80 μm, a thickness h2 of the supporting member 11B on the output side is 160 μm, their retardation $R1 \cdot h1 \approx R2 \cdot h2 \approx 55$ nm. Further, the retardation of the first optical retardation compensation film 14 on the incident side is set $\Delta nr1 \cdot dr1 \approx 142$ nm, $Nz \approx 0.0$, and the retardation of the second optical retardation compensation film 13 on the output side is set $\Delta nr2 \cdot dr2 \approx 252$ nm, $Nz \approx 0.0$.

In FIG. 14, consider the wavelength dependency regarding a light ranging from 400 nm to 700 nm that is an approximate visible range in which the light is viewed at the azimuth angle $\Phi=45°$, the viewing angle $\theta=60°$. Here, it is assumed that for the first optical retardation compensation film 14, $\Delta nr1 \cdot dr1=142$ nm, $Nz1=0.0$, for the second optical retardation compensation film 13, $\Delta nr2 \cdot dr2=252$ nm, and $Nz1=0.0$. Incident light viewed at the azimuth angle $\Phi=45°$, the viewing angle $\theta=60°$ has a polarizing condition 200T after transmission through the transmission axes 12CT of the polarizing layer 12C. The retardation R1·h1 of the supporting member 13B rotates polarizing light clockwise when viewed from "−1" side of the S1 axis by an amount of the retardation R1·h1, to convert the light into the left-handed elliptical polarizing light in a polarizing condition 232. Here, because the length of the polarizing condition 232 indicates light is converted in different polarizing condition in accordance with wavelength because the retardation varies in accordance with wavelength. Further, because the first optical retardation compensation film 14 has $Nz1=0.0$ and the slow axis 14S is in parallel to the absorbing axis 12CA of the first polarizing plate 12, the polarizing condition is rotated clockwise around the polarizing condition 201A by an amount of the retardation $\Delta nr1 \cdot dr1$, so that it is converted into a polarizing condition 233 having a broadened wavelength range. Further, the liquid crystal layer 15 rotates the polarizing condition clockwise around the point 200T of the polarizing condition by rotation 331 corresponding to an amount of retardation $\Delta nLC \cdot dLC$, so that the polarizing condition is converted into a polarizing condition 234 of elliptical polarizing light having a wider wavelength range.

Next, to compensate the wavelength dispersion by this liquid crystal layer 15, the second optical retardation compensation film 13 arranges the slow axis 13A perpendicularly to the alignment direction 15S and $Nz=0.0$, so that the polarizing condition around the point of the polarizing condition 200T by rotation 332 corresponding to the retardation $\Delta nr2 \cdot dr2$ clockwise, so that the condition is converted into a polarizing condition 235 having a wider wavelength range. During this, this rotation is opposite to the retardation of the liquid crystal layer 15, so that the wavelength dispersion can be compensated. Further, retardation R2·h2 of the supporting member 11B on the output side polarizing plate 11 rotates the polarizing condition by an amount of the retardation R2·h2 clockwise when viewed from the side "−1" of the S1 axis to provide a polarizing condition 236 of elliptical polarizing light.

Here, the polarizing condition agreeing with the absorbing axis 11CA of the polarizing layer 11C on the output side is 201A, distances between the polarizing conditions 236 and 201A represents occurrence of light leakage. It has been seen that luminance at black-representation area at the viewing angle mentioned above can be reduced by the above-described optimum values of $\Delta nr1 \cdot dr1$, $Nz1$, $\Delta nr2 \cdot dr2$, and $Nz2$, in accordance with the retardation $\Delta nLC \cdot dLC$ of the liquid crystal 15. Then, the black-representation transmittance Tb at the azimuth $\Phi=45°$ and the viewing angle $\theta=60°$ is not greater than about 0.08%. Thus, the black-representation luminance can be largely reduced.

Further, regarding the azimuth dependency, as shown in FIG. 15, the azimuth angle of 45° shows a largest wavelength dependency with respect to wavelength. However, with respect to deviation from the azimuth angle 45°, symmetrical characteristics can be approximately obtained, which can decrease the azimuth angle of dependency.

TENTH EMBODIMENT

In this embodiment, only physical values of the first and second optical retardation compensation films 14 and 13 are different from those in FIG. 9, but other physical values are the same. More specifically, in this embodiment, regarding the input side optical retardation compensation film 14, the retardation $\Delta nr1 \cdot dr1 \approx 138$ nm, and $Nz \approx 0.5$, and regarding the output side optical retardation compensation film 13, the retardation $\Delta nr2 \cdot dr2 \approx 282$ nm, and $Nz \approx 0.5$.

Figure 16:
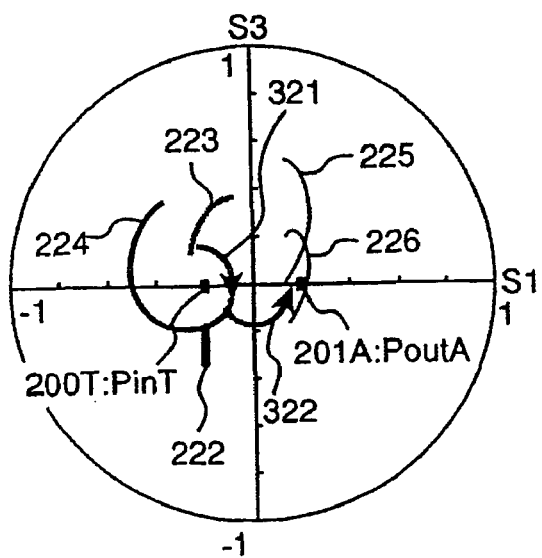
FIG. 16 is a Poincare sphere drawing illustrating an embodiment of the liquid crystal display apparatus according to the present invention.

In FIG. 16, consider the dependency regarding light of which wavelength rages from 400 nm to 700 nm that is an approximate visible range, with assumption that the light viewed at the azimuth angle $\Phi=45°$, the viewing of angle $\theta=60°$. Further, it is assumed that for the first optical retardation compensation film 14, $\Delta nr1 \cdot dr1 = 142$ nm, and $Nz1=0.0$, for the second optical retardation compensation film 13, $\Delta nr2 \cdot dr2 = 252$ nm, and $Nz1=0.0$.

Incident light viewed at the azimuth angle $\Phi=45°$, the viewing angle $\theta=60°$ has a polarizing condition 200T after transmission through the transmission axes 12CT of the polarizing layer. The retardation $R1 \cdot h1$ rotates light clockwise when viewed from "−1" side of the S1 axis by an amount of retardation $R1 \cdot h1$, to convert the light into left-handed elliptical polarizing light in a polarizing condition 222. Here, because the length of the polarizing condition 222 indicates light is converted in a different polarizing condition in accordance with wavelength because the retardation varies in accordance with the wavelength. Further, because the first optical retardation compensation film 14 has $Nz1=0.5$, and the slow axis 14S is in parallel to the absorbing axis 12CA of the first polarizing plate 12, the polarizing condition is rotated clockwise around $S1=S3=0$ which is the center of the polarizing conditions 200T and 201A by an amount of $\Delta nr1 \cdot dr1$, so that it is converted into a polarizing condition 223 having a broadened wavelength range. Further, the liquid crystal layer 15 rotates the polarizing condition clockwise around the point 200T by rotation 321 corresponding to an amount of retardation $\Delta nLC \cdot dLC$, so that the polarizing condition is converted into a polarizing condition 224 of elliptical polarizing light having a wider wavelength range.

Next, to compensate the wavelength dispersion by this liquid crystal layer 15, the second optical retardation compensation film 13 arranges the slow axis 13S perpendicular to the alignment direction 15S and $Nz=0.5$, so that the polarizing condition is rotated around $S1=S3=0$, which is the center of the polarizing conditions 200T and 201A, by rotation 322 corresponding to the retardation $\Delta nr2 \cdot dr2$ counterclockwise, so that the condition is converted into a polarizing condition 225 having a wider wavelength range. During this, this rotation is opposite to the retardation of the liquid crystal layer 15, so that the wavelength dispersion can be compensated. Further, retardation $R2 \cdot h2$ of the supporting member 11B on the output side polarizing plate 11 rotates the polarizing condition by an amount of the retardation $R2 \cdot h2$ clockwise when viewed from the side "−1" of the S1 axis to provide a polarizing condition 226 of elliptical polarizing light.

Figure 17:
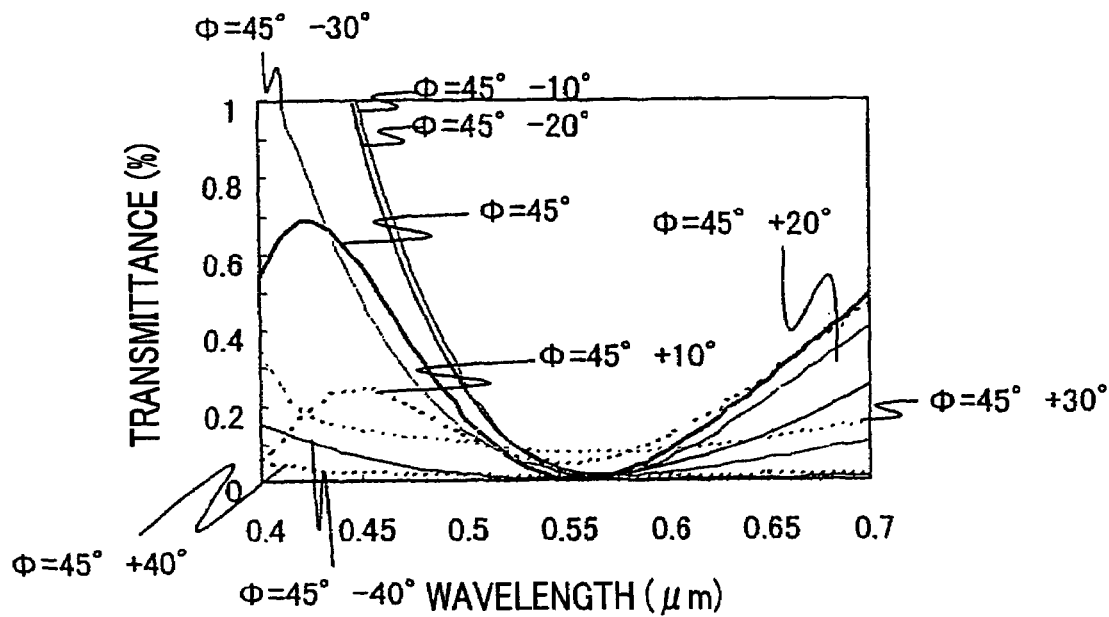
FIG. 17 is a graphical drawing illustrating characteristics of an embodiment of the liquid crystal display apparatus according to the present invention.

Here, the polarizing condition agreeing with the absorbing axis 11CA of the polarizing layer 11 on the output side is 201A and thus a distance between the polarizing conditions 236 and 201A represents occurrence of light leakage. It has been seen that luminance at black-representation areas at the viewing angle mentioned above can be reduced by the above-described optimum values of $\Delta nr1 \cdot dr1$, $Nz1$, $\Delta nr2 \cdot dr2$, and $Nz2$, in accordance with the retardation $\Delta nLC \cdot dLC$ of the liquid crystal 15. Then, the black-representation transmittance Tb at the azimuth angle $\Phi=45°$ and the viewing angle $\theta=60°$ is not greater than about 0.1%. Thus, the black-representation luminance can be largely reduced. Further, regarding the azimuth angle dependency, as shown in FIG. 17, with deviation from the azimuth angle of 45° the wavelength dependency varies in accordance with whether the deviation is in the positive or negative direction. However, in any azimuth, there is no largely increased luminance level and the color shift can be also reduced.

ELEVENTH EMBODIMENT

In this embodiment, only physical values of first and second optical retardation compensation films 14 and 13 and supporting members 11A, 11B, 12A, and 12B are different from those of ninth and tenth embodiments, but other physical values are the same.

In this embodiment, the supporting members 11A, 11B, 12A and 12B for polarizing plates 11 and 12 are made of TAC and have thickness of about 40 μm. When a thickness h1 of the supporting member 12B is 40 μm, a thickness h2 of the supporting member 11B on the output side is 40 μm, their retardations $R1 \cdot h1 \approx R2 \cdot h2 \approx 38$ nm. Further, the retardation of the first optical phase compensation film 14 on the incident side is set $\Delta nr1 \cdot dr1 \approx 30$ nm, and $Nz \approx 0.25$, and the retardation of the second optical retardation compensation film 13 on the output side is set $\Delta nr2 \cdot dr2 \approx 173$ nm, and $Nz \approx 0.25$.

Figure 18:
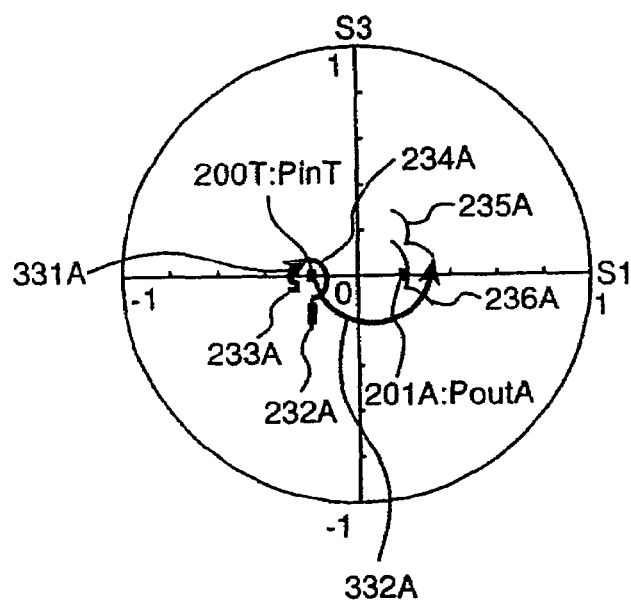
FIG. 18 is a Poincare sphere drawing illustrating an embodiment of the liquid crystal display apparatus according to the present invention.

In FIG. 18, the wavelength dependency regarding light of which wavelength ranges from 400 nm to 700 nm that is an approximate visible range. The light viewed at the azimuth angle $\Phi=45°$, the viewing angle $\theta=60°$ has a polarizing condition 200T after transmission through the first polarizing plate 12 having transmission axes 12CT. The retardation $R1 \cdot h1$ rotates light clockwise when viewed from "−1" side of the S1 axis by an amount of retardation $R1 \cdot h1$, to convert the light into left-handed elliptical polarizing light in a polarizing condition 232A. Here, because the length of the polarizing condition 232A indicates the light is converted in a different polarizing condition in accordance with the wavelength because the retardation varies in accordance with the wavelength. Further, because the first optical retardation compensation film 14 has $Nz1=0.25$, and the slow axis 14S is in parallel to the absorbing axis 12CA of the first polarizing plate 12, the polarizing condition is rotated clockwise around a middle point between 201A and $S1=S3=0$ as a substantial center of rotation by an amount of $\Delta nr1 \cdot dr1$, so that it is converted into a polarizing condition 233A having a broadened wavelength range. Further, the liquid crystal layer 15 rotates the polarizing condition clockwise around the point 200T by rotation 331A corresponding to an amount of retardation $\Delta nLC \cdot dLC$, so that the polarizing condition is converted into a polarizing condition 234A of elliptical polarizing light having a wider wavelength range.

Next, to compensate the wavelength dispersion by this liquid crystal layer 15, the second optical retardation compensation film 13 arranges the slow axis 13S perpendicular to the alignment axis 15S of the liquid crystal layer 15 and Nz=0.25, so that the polarizing condition is counterclockwise rotated around a center between 200T and S1=S3=0 by rotation 332A corresponding to the retardation $\Delta nr2 \cdot dr2$, so that the condition is converted into a polarizing condition 235A having a wider wavelength range. During this, this rotation is opposite to the retardation of the liquid crystal layer, so that the wavelength dispersion can be compensated. Further, retardation R2·h2 of the supporting member 11B on the output side polarizing plate 11 rotates the polarizing condition by an amount of the retardation R2·h2 clockwise when viewed from the side "−1" of the S1 axis to provide a polarizing condition 236A of elliptical polarizing light.

Figure 19:
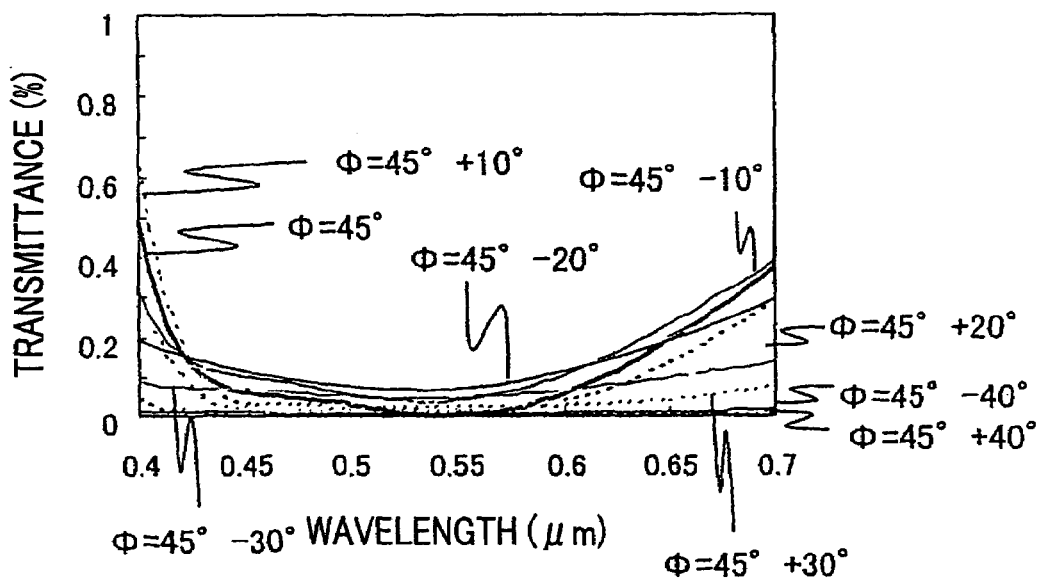
FIG. 19 is a graphical drawing illustrating characteristics of an embodiment of the liquid crystal display apparatus according to the present invention.

Here, the polarizing condition agreeing with the absorbing axis 11CA of the polarizing layer 11 on the output side is 201A, and thus distances between the polarizing conditions 236 and 201A represent occurrence of light leakage. It has been seen that luminance at the black-representation area the viewing angle mentioned above can be reduced by the above-described optimum values of $\Delta nr1 \cdot dr1$, Nz1, $\Delta nr2 \cdot dr2$, and Nz2, in accordance with the retardation $\Delta nLC \cdot dLC$ of the liquid crystal 15. Then, the black-representation transmittance Tb at the azimuth angle $\Phi=45°$ and the viewing angle $\theta=60°$ is not greater than about 0.05%. Thus, the black-representation luminance level can be largely reduced. Further, regarding the orientation dependency, as shown in FIG. 19, the azimuth angle of 45° shows a largest wavelength dependency with respect to wavelength. However, with respect to deviation from the azimuth angle 45°, symmetrical characteristics can be approximately obtained, which can decrease the azimuth angle of dependency, and the color shift can be also reduced.

TWELFTH EMBODIMENT

Figure 20:
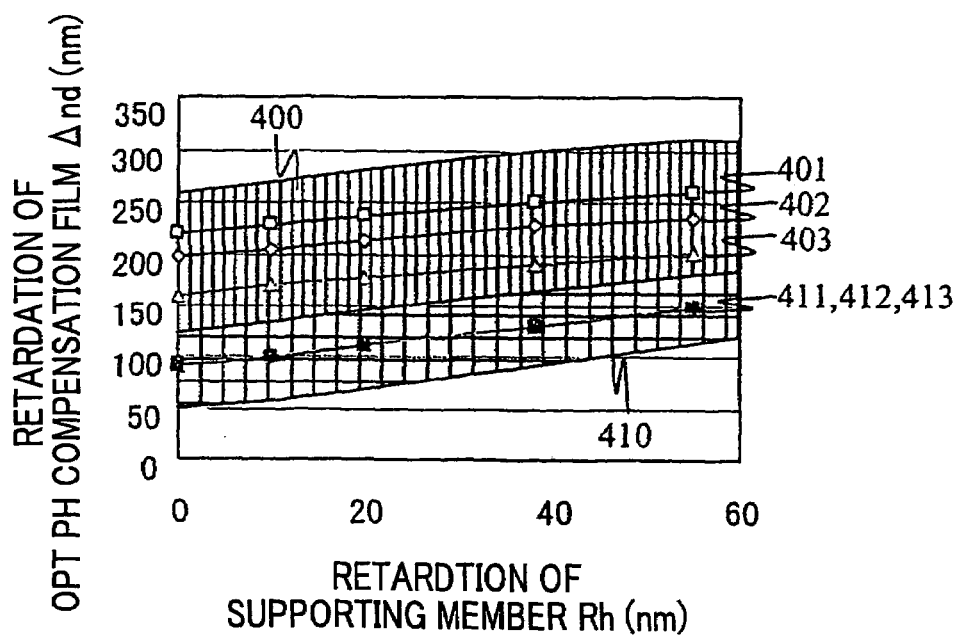
FIG. 20 is a graphical drawing illustrating characteristics of an embodiment of the liquid crystal display apparatus according to the present invention.

In the ninth embodiment, using the retardation $\Delta nLC \cdot dLC$ of the liquid crystal and the retardation R·h of the supporting members as parameters, retardation $\cdot nr1 \cdot dr1$ and $\Delta nr2 \cdot dr2$ minimizing the black-representation transmittance Tb at the azimuth angle $\Phi=45°$ at the viewing angle $\theta=60°$ was obtained with assumption that the Nz coefficients of the first and second optical retardation compensation films 14 and 13 are Nz1=Nz2=0.0. FIG. 20 shows the result.

The axis of abscissa X represents the retardation Rh of the upper and lower supporting members 12B and 11B and the axis of ordinates Y represents the retardations $\Delta nr1 \cdot dr1$ and $\Delta nr2 \cdot dr2$ as parameters.

Curves 401, 402, and 403 represent optimum values of the retardation $\Delta nr2 \cdot dr2$ within the plane of the second optical retardation compensation film 13 when the retardation of the liquid crystal layer $\Delta nLC \cdot dLC$ are 250 nm, 290 nm, and 310 nm, respectively. Curves 411, 412, and 413 represent optimum values of the retardation $\Delta nr1 \cdot dr1$ within the plane of the first optical retardation compensation film 14 when the retardation of the liquid crystal layer $\Delta nLC \cdot dLC$ is 250 nm, 290 nm, and 310 nm, respectively.

The region 400 represents the optimum retardation $\Delta nr2 \cdot dr2$ within the plane of the second optical retardation compensation film 13 when the retardation of the liquid crystal layer $\Delta nLC \cdot dLC$ is varied from 220 nm to 370 nm, and the retardation R·h is varied from 0 to 60 nm, which is represented by Equation (6). In this condition, the optimum retardation $\Delta nr1 \cdot dr1$ within the plane of the first optical retardation compensation film 14 is represented by Equation (7). In this condition, the black-representation transmittance Tb at the azimuth angle $\Phi=45°$ and the viewing angle $\theta=60°$ is not greater than about 0.35%. Thus, the black-representation luminance and the color shift can be largely reduced.

This analysis was made up to the retardation Rh of 60 nm. However, this result is also effective to values not greater than 60 nm. Further this analysis was made under the condition Nz=0.0. However, this analysis is effective when the Nz coefficients of respective optical retardation compensation films 14 and 13 are −0.15<Nz1<0.15 and −0.15<Nz2<0.15.

$$40+1.056 \cdot X - 0.0004 \cdot X^2 \le \Delta nr2 \cdot dr2 \le 140+1.056 \cdot X - 0.0004 \cdot X^2 \qquad (6)$$

$$110+X-0.0047 \cdot X^2 \le \Delta nr1 \cdot dr1 \le 270+X-0.0047 \cdot X^2 \qquad (7)$$

Here, X represents the retardation of the upper and lower supporting members 12B and 11B, and X=Rh=R1·h1=R2·h2.

THIRTEENTH EMBODIMENT

Figure 21:
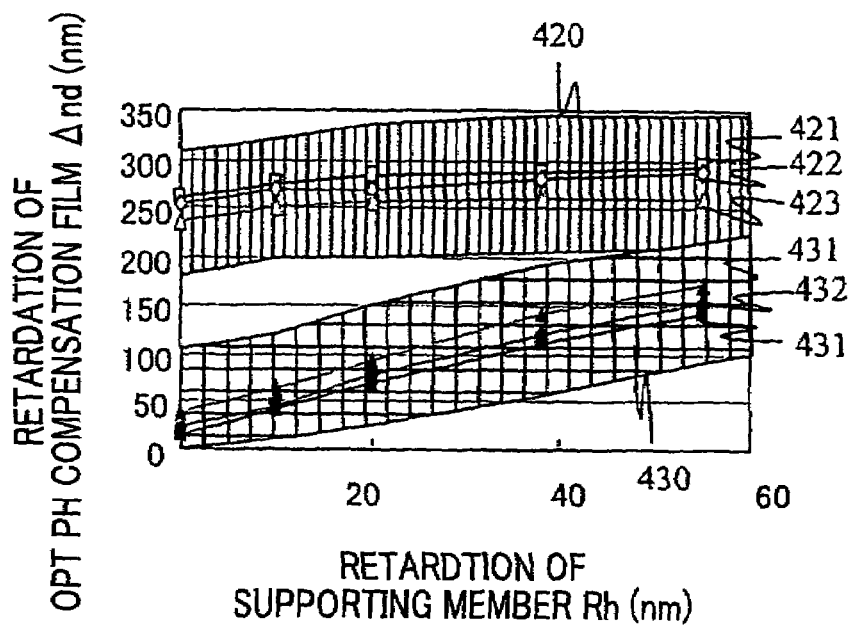
FIG. 21 is a graphical drawing illustrating characteristics of an embodiment of the liquid crystal display apparatus according to the present invention.

In the tenth embodiment, using the retardation $\Delta nLC \cdot dLC$ of the liquid crystal and the retardation R·h of the supporting members as parameters, the retardation $\Delta nr1 \cdot dr1$ and $\Delta nr2 \cdot dr2$ minimizing the black-representation transmittance Tb at the azimuth angle $\Phi=45°$ at the viewing angle $\theta=60°$ was obtained with assumption that the Nz coefficients of the first and second optical retardation compensation films 14 and 13 are Nz1=Nz2=0.5. FIG. 21 shows the result.

The axis of abscissa X represents the retardation Rh of the upper and lower supporting members 12B and 11B and the axis of ordinates Y represents the retardations $\Delta nr1 \cdot dr1$ and $\Delta nr2 \cdot dr2$ as parameters.

Curves 421, 422, and 423 represent optimum values of the retardation $\Delta nr2 \cdot dr2$ within the plane of the second optical retardation compensation film 13 when the retardation of the liquid crystal layer $\Delta nLC \cdot dLC$ is 250 nm, 290 nm, and 310 nm, respectively. Curves 431, 432, and 433 represent optimum values of the retardation $\Delta nr1 \cdot dr1$ within the plane of the first optical retardation compensation film 14 when the values of the retardation of the liquid crystal layer $\Delta nLC \cdot dLC$ are 250 nm, 290 nm, and 310 nm, respectively.

The region 420 represents the optimum retardation $\Delta nr2 \cdot dr2$ within the plane of the second optical retardation compensation film 13 when the retardation $\Delta nLC \cdot dLC$ of the liquid crystal layer is varied from 220 nm to 370 nm, and the retardation R·h of the supporting members is varied from 0 to 60 nm, which is represented by Equation (8). In this condition, the optimum retardation $\Delta nr1 \cdot dr1$ within the plane of the first optical retardation compensation film 14 is a region 430 represented by Equation (9). In this condition, the black-representation luminance transmittance Tb at the azimuth angle $\Phi=45°$ and the viewing angle $\theta=60°$ is not greater than about 0.35%. Thus, the black-representation luminance and the color shift can be largely reduced.

This analysis was done up to the retardation Rh of 60 nm. However, this result is also effective to values not greater than 60 nm. Further this analysis was made under the condition Nz=0.5. However, this analysis is effective when the Nz coefficients of respective optical retardation compensation films 14 and 13 are 0.35<Nz1<0.65 and 0.35<Nz2<0.65.

$$185+1.155 \cdot X - 0.0138 \cdot X^2 \le \Delta nr2 \cdot dr2 \le 315+1.252 \cdot X - 0.0134 \cdot X^2 \qquad (8)$$

$$-35+2.86 \cdot X - 0.00964 \cdot X^2 \le \Delta nr1 \cdot dr1 \le 90+3.04 \cdot X - 0.00465 \cdot X^2 \qquad (9)$$

Here, X represents the retardation, in thickness directions, of the upper and lower supporting members 12B and 11B, and X=Rh=R1·h1=R2·h2.

FOURTEENTH EMBODIMENT

Figure 22:
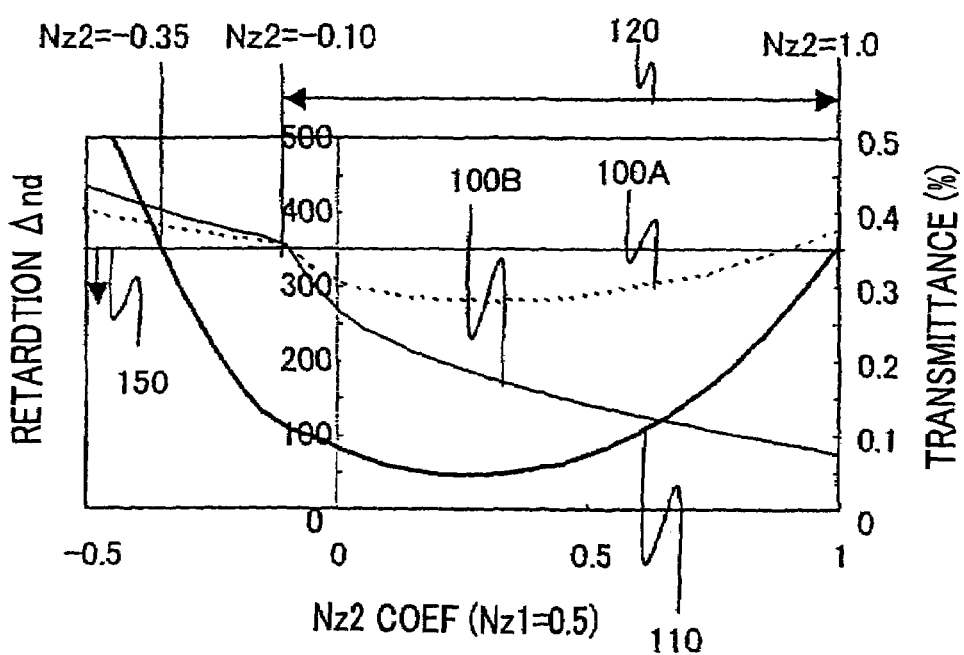
FIG. 22 is a graphical drawing illustrating characteristics of an embodiment of the liquid crystal display apparatus according to the present invention.

Analysis was made in the condition of the ninth embodiment in which parameters of the first and second optical retardation compensation films 14 and 13 are further varied. Thus, other structures and parameters are the same as those of the ninth embodiment. First, the Nz coefficient of the first optical retardation compensation film 14 is set Nz1=0.5, and the retardation $\Delta nLC \cdot dLC$ of the liquid crystal is set $\Delta nLC \cdot dLC$=310 nm. Then, the Nz coefficient Nz2 of the second optical retardation compensation film 13 is represented on the axis of abscissa, the retardation $\Delta nr2 \cdot dr2$ and the retardation $\cdot nr1 \cdot dr1$ is represented on the left axis of ordinate, and minimum values of the black-representation transmittance Tb at the azimuth angle $\Phi$=45° and the viewing angle $\theta$=60° are represented on the right axis of ordinate. Then, the result of analysis is as shown in FIG. 22. A curve 110 represents minimum values of the black-representation transmittance Tb when optimization is made. A curve 100A represents the retardation $\Delta nr2 \cdot dr2$ of the second optical phase compensation film 13 in that condition, and a curve 100B represents the retardation $\Delta nr1 \cdot dr1$ of the first optical retardation compensation film 14 in that condition.

As a result, when the coefficient Nz2 of the second optical retardation compensation film 13 is $-0.35<Nz2<1.0$, the black-representation transmittance Tb is not grater than 0.35% (region 150), so that the reduction in the black-representation luminance can be provided. Further, in the range 120 where $-0.35<Nz2<1.0$, the condition $\Delta nr1 \cdot dr1 < \Delta nr2 \cdot dr2$ is satisfied, so that the azimuth angle dependency in the color shift can be reduced. FIG. 22 shows the result in which Nz1=0.5. However, this is effective when $0.35<Nz1<0.65$.

FIFTEENTH EMBODIMENT

Figure 23:
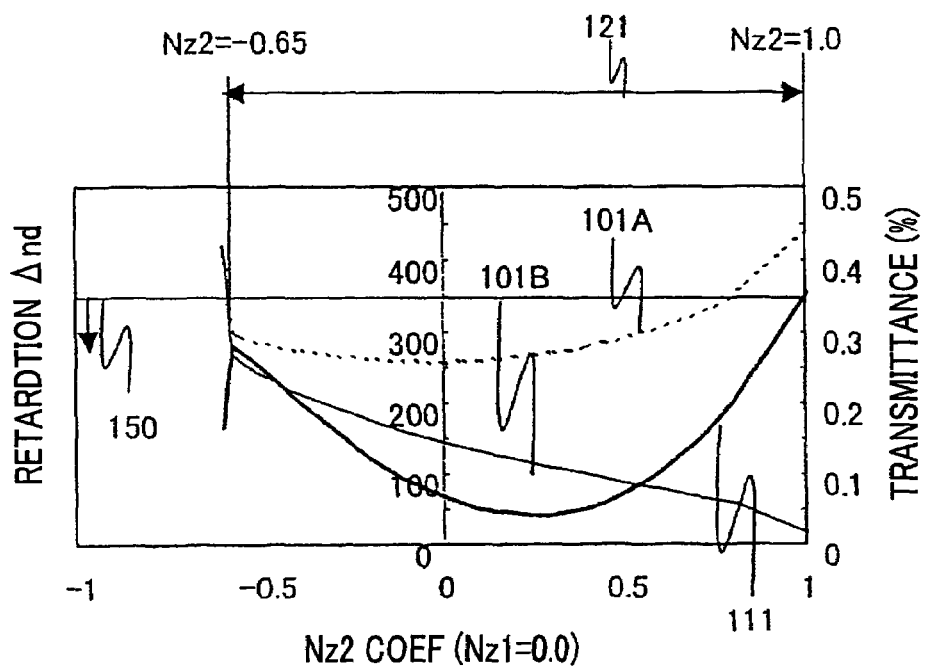
FIG. 23 is a graphical drawing illustrating characteristics of an embodiment of the liquid crystal display apparatus according to the present invention.

Analysis was made in the condition of the ninth embodiment in which parameters of the first and second optical retardation compensation films 14 and 13 are further varied. Thus, other structures and parameters are the same as those of the ninth embodiments. First, the Nz coefficient of the first optical retardation compensation film 14 is set Nz1=0.0, and the retardation $\Delta nLC \cdot dLC$ of the liquid crystal is set $\Delta nLC \cdot dLC$=310 nm. Then, the Nz coefficient Nz2 of the second optical retardation compensation film 13 is represented on the axis of abscissa, the retardation $\Delta nr2 \cdot dr2$ and the retardation $\Delta nr1 \cdot dr1$ is represented on the left axis of ordinate, and minimum values of the black-representation transmittance Tb at the azimuth angle $\Phi$=45° and the viewing angle $\theta$=60° are represented on the right axis of ordinate. Then, the result of analysis is as shown in FIG. 23. A curve 111 represents minimum values of the black-representation transmittance Tb when optimization is made. A curve 101A represents the retardation $\Delta nr2 \cdot dr2$ of the second optical retardation compensation film 13 in that condition, and a curve 101B represents the retardation $\Delta nr1 \cdot dr1$ of the first optical retardation compensation film 14 in that condition.

As a result, when the coefficient Nz2 of the second optical retardation compensation film 13 is $-0.65<Nz2<1.0$, the black-representation transmittance is not grater than 0.35% (region 150), so that the reduction in the black-representation luminance can be provided. Further, in the range 121 where $-0.10<Nz2<1.0$, the condition $\Delta nr1 \cdot dr1 < \Delta nr2 \cdot dr2$ is satisfied, so that the azimuth angle dependency in the color shift can be reduced. FIG. 23 shows the result in which Nz1=0.0. However, this is effective when $-0.15<Nz1<0.15$.

SIXTEENTH EMBODIMENT

Analysis was made in the condition of the ninth embodiment in which parameters of the first and second optical retardation compensation films 14 and 13 are further varied. Thus, other structures and parameters are the same as those of the ninth embodiments. First, the Nz coefficient of the first optical retardation compensation film 14 is set Nz1=0.25, the retardation $\Delta nLC \cdot dLC$ of the liquid crystal is set $\Delta nLC \cdot dLC$=310 nm. Then, the Nz coefficient Nz2 of the second optical retardation compensation film 13 is represented on the axis of abscissa, the retardation $\Delta nr2 \cdot dr2$ and the retardation $\Delta nr1 \cdot dr1$ is represented on the left axis of ordinate, and minimum values of the black-representation transmittance Tb at the azimuth angle $\Phi$=45° and the viewing angle $\theta$=60° are represented on the right axis of ordinate.

As a result, when the coefficient Nz2 of the second optical retardation compensation film 13 is $-0.5 \leq Nz2 \leq 1.0$, the black-representation transmittance is not grater than 0.35% (region 150), so that the reduction in the black-representation luminance can be provided. The result is obtained when Nz1=0.25. However, this is effective when $-0.1<Nz1<0.4$.

SEVENTEENTH EMBODIMENT

Figure 24:
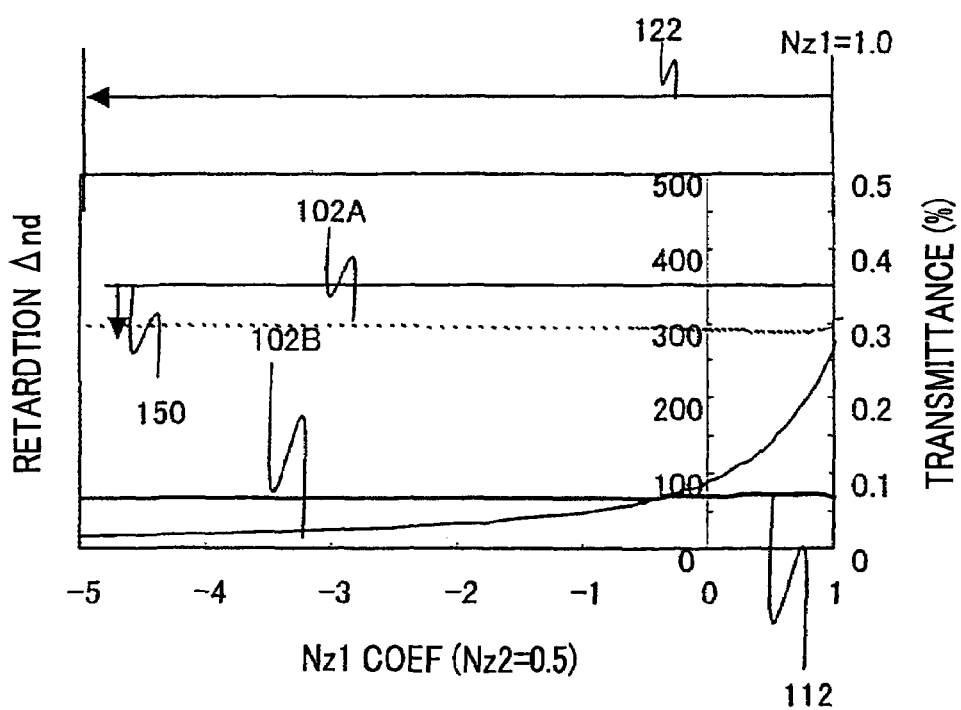
FIG. 24 is a graphical drawing illustrating characteristics of an embodiment of the liquid crystal display apparatus according to the present invention.

Analysis was made in the condition of the ninth embodiment in which parameters of the first and second optical retardation compensation films 14 and 13 are further varied. Thus, other structures and parameters are the same as those of the ninth embodiment. First, the Nz coefficient of the second optical retardation compensation film 13 is set Nz2=0.5, the retardation $\Delta nLC \cdot dLC$ of the liquid crystal is set $\Delta nLC \cdot dLC$=310 nm. Then, the Nz coefficient Nz1 of the first optical retardation compensation film 14 is represented on the axis of abscissa, the retardation $\Delta nr1 \cdot dr1$ and the retardation $\Delta nr2 \cdot dr2$ of the second optical retardation compensation film 13 is represented on the left axis of ordinate, and minimum values of the black-representation transmittance Tb at the azimuth angle $\Phi$=45° and the viewing angle $\theta$=60° are represented on the right axis of ordinate. Then, the result of analysis is shown in FIG. 24. A curve 112 represents minimum values of the black-representation transmittance Tb when optimization is made. A curve 102A represents the retardation $\Delta nr2 \cdot dr2$ of the second optical retardation compensation film 13 in that condition, and a curve 102B represents the retardation $\Delta nr1 \cdot dr1$ of the first optical retardation compensation film 14 in that condition.

As a result, when the coefficient Nz1 of the first optical retardation compensation film 14 is Nz1$\leq$1.0 (region 122), the black-representation transmittance Tb is not grater than 0.35% (region 150), so that the reduction in the black-representation luminance can be provided. FIG. 24 shows the result in which Nz2=0.0. However, this is effective when $0.35<Nz2<0.65$.

EIGHTEENTH EMBODIMENT

Figure 25:
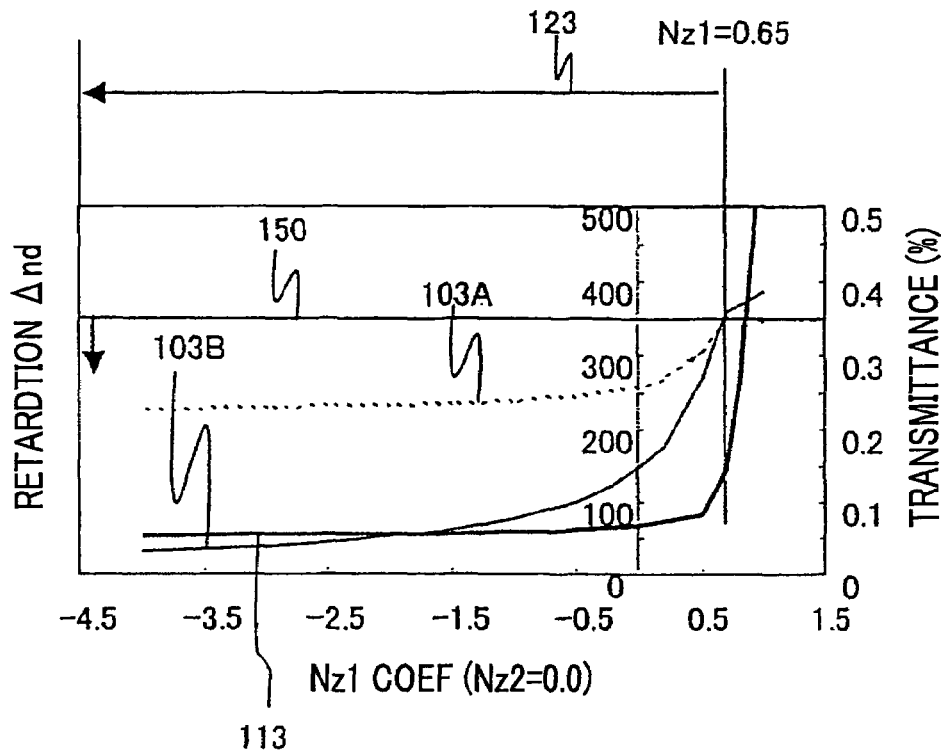
FIG. 25 is a graphical drawing illustrating characteristics of an embodiment of the liquid crystal display apparatus according to the present invention.

Analysis was made in the condition of the ninth embodiment in which parameters of the first and second optical retardation compensation films 14 and 13 are further varied. Thus, other structures and parameters are the same as those of the ninth embodiment. First, the Nz coefficient of the second optical retardation compensation film 13 is set Nz2=0.25, the retardation $\Delta nLC \cdot dLC$ of the liquid crystal is set $\Delta nLC \cdot dLC$=310 nm. Then, the Nz coefficient Nz1 of the first optical retardation compensation film 14 is represented on the axis of abscissa, the retardation $\Delta nr1 \cdot dr1$ and the retardation $\Delta nr2 \cdot dr2$ of the second optical retardation compensation film 13 is represented on the left axis of ordinate, and minimum values of the black-representation transmittance Tb at the azimuth angle $\Phi=45°$ and the viewing angle $\theta=60°$ are represented on the right axis of ordinate. Then, the result of analysis is shown in FIG. 25. A curve 113 represents minimum values of the black-representation transmittance Tb when optimization is made. A curve 103A represents the retardation $\Delta nr2 \cdot dr2$ of the second optical retardation compensation film 13 in that condition, and a curve 103B represents the retardation $\Delta nr1 \cdot dr1$ of the first optical retardation compensation film 14 in that condition.

As a result, when the coefficient Nz1 of the first optical retardation compensation film 14 is Nz1$\leq$0.65 (region 123), the black-representation transmittance is not grater than 0.35% (region 150), so that the reduction in the black-representation luminance can be provided. FIG. 25 shows the result in which Nz2=0.0. However, this is effective when $-0.15 < Nz2 < 0.15$.

NINETEENTH EMBODIMENT

Analysis was made in the condition of the ninth embodiment in which parameters of the first and second optical retardation compensation films 14 and 13 are further varied. Thus, other structures and parameters are the same as those of the ninth embodiments. First, the Nz coefficient of the second optical retardation compensation film 13 is set Nz2=0.25, the retardation $\Delta nLC \cdot dLC$ of the liquid crystal is set $\Delta nLC \cdot dLC$=310 nm. Then, the Nz coefficient Nz1 of the first optical retardation compensation film 14 is represented on the axis of abscissa, the retardation $\Delta nr1 \cdot dr1$ and the retardation $\Delta nr2 \cdot dr2$ of the second optical retardation compensation film 13 is represented on the left axis of ordinate, and minimum values of the black-representation transmittance Tb at the azimuth angle $\Phi=45°$ and the viewing angle $\theta=60°$ is represented on the right axis of ordinate.

As a result, when the coefficient Nz1 of the first optical retardation compensation film 14 is Nz1$\leq$0.85, the black-representation transmittance Tb is not grater than 0.35% (region 150), so that the reduction in the black-representation luminance can be provided. This is also effective when $0.1 < Nz2 < 0.4$.

TWENTIETH EMBODIMENT

Analysis was made in the condition of the ninth embodiment in which the retardation $\Delta nLC \cdot dLC$ of liquid crystal, the retardation R·h of supporting members, and parameters of the first and second optical retardation compensation films 14 and 13 are further varied. Thus, other structures and parameters are the same as those of the ninth embodiment. First, the Nz coefficients of the first and second optical retardation compensation films 14 and 13 are substantially equalized, that is, Nz1$\approx$Nz2, the retardation $\Delta nLC \cdot dLC$ of the liquid crystal is set $\Delta nLC \cdot dLC$=290 nm. Further, the retardation of the supporting members 12B and 11B on the inside surfaces of the upper and lower polarizing plates 13 and 14 are R·h$\approx$R1·h1$\approx$R2·h2$\approx$0.38 nm. The thickness h in this condition is h=h1$\approx$h2$\approx$40 μm.

Figure 27:
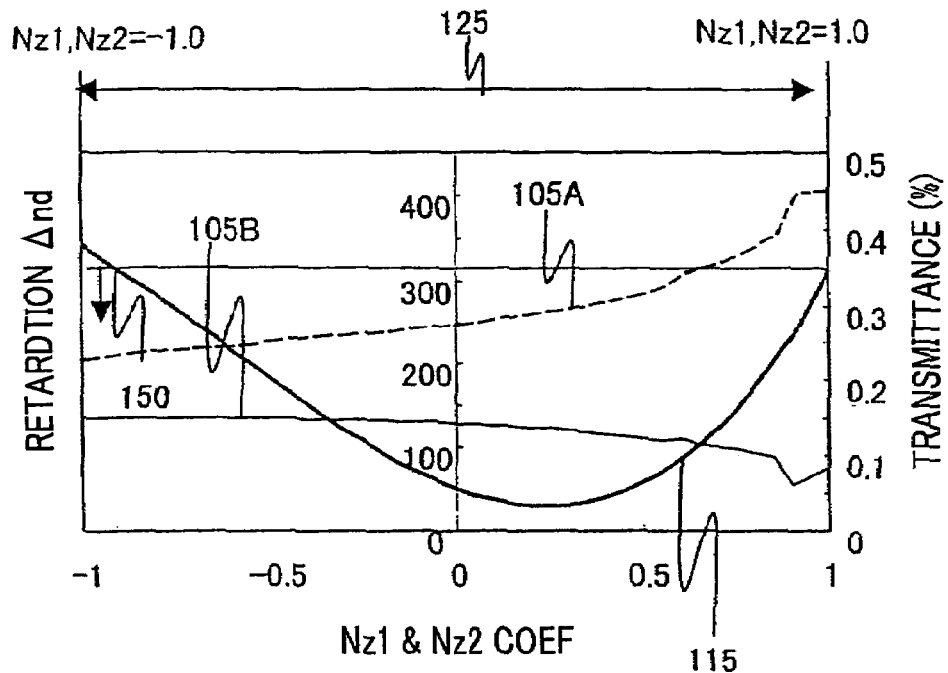
FIG. 27 is a graphical drawing illustrating characteristics of an embodiment of the liquid crystal display apparatus according to the present invention.

Then, the Nz coefficients Nz1 and Nz2 of the first and second optical retardation compensation films 13 and 14 are represented on the axis of abscissa, the retardation $\Delta nr1 \cdot dr1$ and the retardation $\Delta nr2 \cdot dr2$ of the second optical retardation compensation film 13 is represented on the left axis of ordinate, and minimum values of the black-representation transmittance Tb at the azimuth angle $\Phi=45°$ and the viewing angle $\theta=60°$ are represented on the right axis of ordinate. Then, the result of analysis is shown in FIG. 27. A curve 115 represents minimum values of the black-representation transmittance Tb when optimization is made. A curve 105A represents the retardation $\Delta nr2 \cdot dr2$ of the second optical retardation compensation film 13 in that condition, and a curve 105B represents the retardation $\Delta nr1 \cdot dr1$ of the first optical retardation compensation film 14 in that condition.

Figure 26:
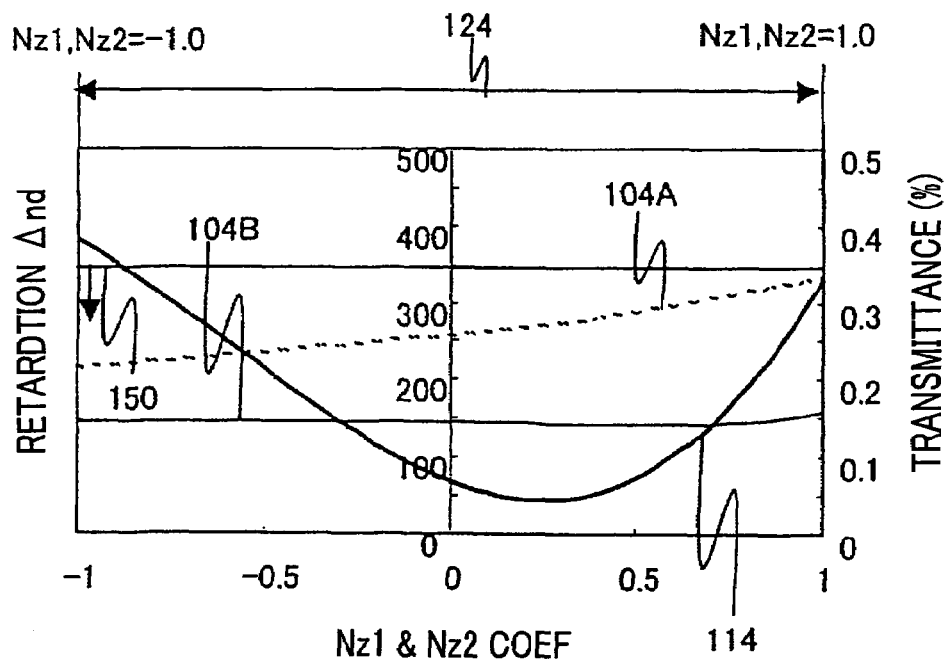
FIG. 26 is a graphical drawing illustrating characteristics of an embodiment of the liquid crystal display apparatus according to the present invention.

As a result, when the coefficients Nz1 and Nz2 of the first and second optical retardation compensation films 14 and 13 are $-1.0 \leq Nz1 \leq 1.0$ and $-1.0 \leq Nz2 < 1.0$ (region 125), respectively, the black-representation transmittance Tb is not grater than 0.35% (region 150), so that the reduction in the black-representation luminance can be provided. In FIG. 27, this is effective when Nz1=Nz2$\pm$0.15. FIG. 26 shows another analysis.

TWENTY-FIRST EMBODIMENT

Analysis was made in the condition of the ninth embodiment in which the retardation of liquid crystal $\Delta nLC \cdot dLC$, the retardation of supporting members R·h, and parameters of the first and second optical retardation compensation films 14 and 13 are further varied. Thus, other structures and parameters are the same as those of the ninth embodiments. First, the Nz coefficients of the first and second optical retardation compensation films 14 and 13 are substantially equalized, that is, Nz1$\approx$Nz2, the retardation $\Delta nLC \cdot dLC$ of the liquid crystal is set $\Delta nLC \cdot dLC$=250 nm. Further, the retardation of the supporting members 12B and 11B on the inside surfaces of the upper and lower polarizing plates 11 and 12 are R·h$\approx$R1·h1$\approx$R2·h2$\approx$38 nm. The thickness h in this condition is h=h1$\approx$h2$\approx$0.40 μm.

Figure 28:
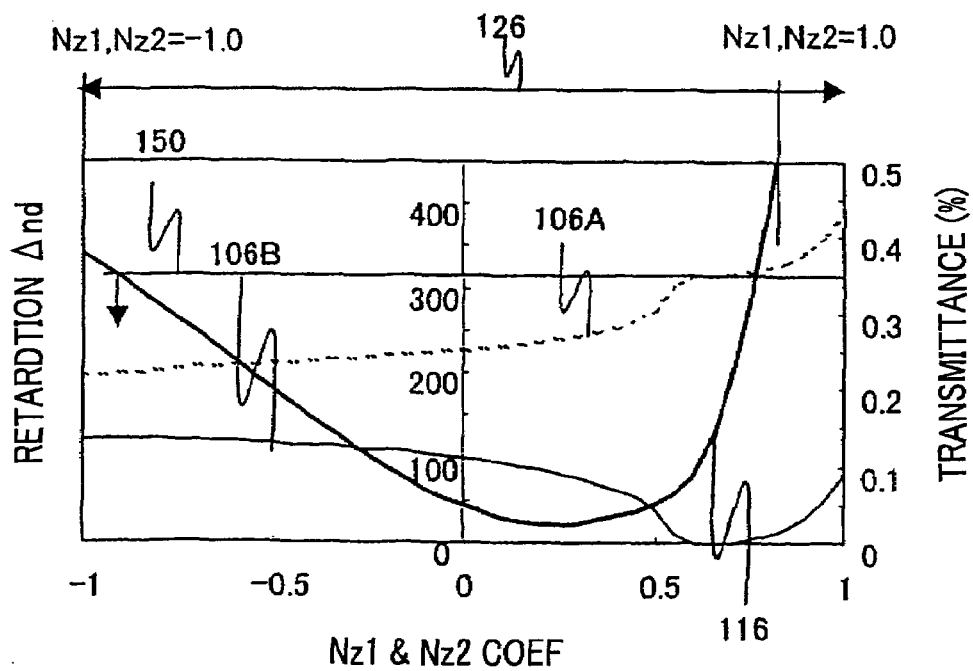
FIG. 28 is a graphical drawing illustrating characteristics of an embodiment of the liquid crystal display apparatus according to the present invention.

Then, the Nz coefficients Nz1 and Nz2 of the first and second optical retardation compensation films 14 and 13 are represented on the axis of abscissa, the retardation $\Delta nr1 \cdot dr1$ and the retardation $\Delta nr2 \cdot dr2$ of the second optical retardation compensation film 13 is represented on the left axis of ordinate, and minimum values of the black-representation transmittance Tb at the orientation $\Phi=45°$ and the viewing angle $\theta=60°$ are represented on the right axis of ordinate. Then, the result of analysis is shown in FIG. 28. A curve 116 represents minimum values of the black-representation transmittance Tb when optimization is made. A curve 106A represents the retardation $\Delta nr2 \cdot dr2$ of the second optical retardation compensation film 13 in that condition, and a curve 106B represents the retardation $\Delta nr1 \cdot dr1$ of the first optical retardation compensation film 14 in that condition.

As a result, when the coefficients Nz1 and Nz2 of the first and second optical retardation compensation films 14 and 13 are $-1.0 \leq Nz1 \leq 1.0$ and $-1.0 \leq Nz2 \leq 1.0$ (region 126), respectively, the black-representation transmittance Tb is not grater than 0.35% (region 150), so that the reduction in the black-representation luminance can be provided. In FIG. 28, this is effective when Nz1=Nz2$\pm$0.15.

TWENTY-SECOND EMBODIMENT

The ninth to twenty-first embodiments have been described with reference to FIGS. 1 to 3, wherein the axis directions of the upper and lower polarizing plates 11 and 12, are, as shown in FIG. 3, set to have an O-mode. More specifically, the polarizing transmission axis 12CT of the polarizing layer 12C of the incident side polarizing plate 12 is perpendicular to the polarizing transmission axis 11CT of the polarizing layer 11C of the output side polarizing plate 11, and the liquid crystal alignment axis 15S of the liquid crystal layer 15 is perpendicular to the absorbing axis 12CA of the polarizing layer 12C of the incident side polarizing plate 12.

On the other hand, consider the E-mode in the structure shown in FIG. 1. More specifically as shown in FIG. 5, the slow axes 14S and 13S of the first and second optical retardation compensation films 14 and 13 are in parallel to the polarizing layers of these polarizing plates 12 and 11, respectively. The slow axis 14S of the incident side optical retardation compensation film 14 is in parallel to the absorbing axis of the polarizing layer 12C of the incident side polarizing plate 12, and the slow axis 13S of the incident side optical retardation compensation film 14 is in parallel to the absorbing axis 11CA of the polarizing layer 11C of the output side polarizing plate 11.

As a result, in the ninth to the twenty-first embodiment, obtaining the structures employing E-mode is equivalent to substituting the values ($\Delta nr2 \cdot dr2$ and $Nz2$) obtained regarding the second optical retardation compensation film 13 in ninth to twenty-first embodiments for those for the first optical retardation compensation film 14 and substituting the values ($\Delta nr1 \cdot dr1$ and $Nz1$) obtained regarding the first optical retardation compensation film 14 in ninth to twenty-first embodiments for those for the first optical retardation compensation film 14. That corresponds to exchanging values therebetween.

In the first to eighth embodiments, this is no problem because the supporting members have almost no in-plane retardation. On the other hand, in ninth to twenty-second embodiments, because the optical retardation compensation films have in-plane retardation $\Delta nr \cdot dr$, if axial deviation occurs in the products, a contrast ratio when viewed in front thereof decreases. Thus, the smaller the in-plane retardation is, the more preferable. Further, it is preferable that a sum of in-plane retardation of the upper and lower optical retardation compensation films 13 and 14 is lower that the retardation of the liquid crystal layer.

TWENTY-THIRD EMBODIMENT

The condition of the first embodiment is further changed into that the cell gaps of red, green, and blue pixels dR, dG, and dB are dR≈4.4 μm, dG≈4.0 μm, and dB≈3.2 μm. A quotient of the retardation of each pixel by $dLC \cdot \Delta n / \lambda$ is set substantially the same. Others are the same as those of the first embodiment. In FIG. 13, a polarizing condition variation 273 in light having a visual range wavelength of 400 nm to 700 nm. On the other hand, as shown by a polarizing condition change 273 in FIG. 29, the black-representation transmittance Tb regarding light at the visible range (380 nm to 780 nm) can be largely reduced. More specifically, as shown by reference 500B in FIG. 30, the black-representation transmittance Tb at the azimuth angle $\Phi=45°$ and the viewing angle $\theta=60°$ is not greater than 0.1%, so that the black-representation luminance can be largely reduced. At the same time, the color shift can be largely reduced. Further, in the multi-gap structure in which the cell gap is varied in accordance with colors of red, green, and blue, there is a possibility that a stepwise portion cannot be sufficiently rubbed in a rubbing process to align the liquid crystal layer. Thus, it is a preferable to adopt the alignment process by optical alignment because the multi-gap structure may cause insufficient rubbing at the step portions.

Furthermore, the setting of the cell gaps of the liquid crystal to have the relation of dR>dG>dB are applicable to second to twenty-second embodiments. Thus, the reduction in the black-representation luminance and in the color shift is further provided.

In this embodiment, the optical retardation compensation films 14 and 13 have different retardation R·h. However, the optical retardation compensation films 14 and 13 may have the same retardation R·h. That is, they have a relation of R1·h1=R2·h2=55 nm, and further a negative a-plate is prepared only for an organic film on either side of a substrate such as a TFT protection film or an alignment film or the like forming the substrate to provide the same advantage effect, though the retardation R·h=55 nm. Further, they have a relation of R1·h1=R2·h2=110 nm, and further a positive a-plate is prepared only for an organic film on either side of the substrate such as the TFT protection film or the alignment film or the like forming the substrate provides the same advantage effect, though the retardation R·h=55 nm. This structure is also included in the above-mentioned structure of R1·h1≠R2·h2.

TWENTY-FOURTH EMBODIMENT

In this embodiment, the conditions used in the twenty-third embodiment are partially changed as follows:

Regarding the cell gaps dLC of liquid crystal cells, the cell gaps of red pixels, green pixels, and blue pixels dR, dG, and dB are dR≈3.8 μm, dG≈3.4 μm, and dB≈2.7 μm, and a quotient of the retardation of each pixel by $dLC \cdot \Delta n / \lambda$ is made substantially constant. Further, an optical retardation compensation film having retardation $\Delta nr1 \cdot dr1 = 50$ nm and a positive uniaxial anisotropic (a-plate) in parallel to the alignment of the liquid crystal on the incident side (either of the upper or lower side of the liquid crystal layer). Other structures are the same as those of the first embodiment. This compensates smallness in the retardation of the liquid crystal cells with the optical retardation compensation film. As a result, the black-representation transmittance Tb at the azimuth angle $\Phi=45°$ and the viewing angle $\theta=60°$ is not greater than 0.1%, which provides substantially the same characteristic as that in the twenty-third embodiment. In other words, the black-representation luminance as well as the color shift can be considerably reduced.

In this embodiment, the cell gaps of the liquid crystal are changed to dR>dG>dB, and the positive uniaxial anisotropic film (a-plate) is employed. This structure is applicable to the second to the twenty-third embodiments, which provides further reduction in the black-representation luminance and the color shift.

TWENTY-FIFTH EMBODIMENT

In this embodiment, the condition used in the twenty-third embodiment is changed as follows:

Regarding the cell gaps dLC of liquid crystal cells, the cell gaps of red pixels, green pixels, and blue pixels dR, dG, and dB are dR≈5.6 μm, dG≈4.6 μm, and dB≈3.8 μm, and a quotient of the retardation of each pixel by $dLC \cdot \Delta n / \lambda$ is made substantially constant. Further, an optical retardation compensation film having $\Delta nr1 \cdot dr1 = 50$ nm and a positive uniaxial anisotropic (a-plate) in parallel to the alignment of the liquid crystal on the incident side (either of the upper or lower side of the liquid crystal layer). Other structures are the same as those of the first embodiment. This compensates largeness in the retardation of the liquid crystal cells with the optical retardation compensation film. As a result, the black-representation transmittance Tb at the azimuth angle $\Phi=45°$ and the viewing angle $\theta=60°$ is not greater than 0.1%, which provides substantially the same characteristic as those in the twenty-third and twenty-fourth embodiments. In other words, the black-representation luminance as well as color shift was able to be considerably reduced.

In this embodiment, the cell gaps of the liquid crystal are changed to dR>dG>dB, and the negative uniaxial anisotropic film (a-plate) is employed. This structure is applicable to the second to the twenty-third embodiments, which provides further reduction in the black-representation luminance and the color shift.

TWENTY-SIXTH EMBODIMENT

In this embodiment, if the polarizing plate supporting members are made of TAC, a method of reducing luminance variation in accordance with the viewing angle will be described with reduction in the number of the optical compensation films.

First, FIGS. 31A and 31B show a structure in which a positive c-plate and a positive a-plate are arranged between the liquid crystal layer 15 and the second polarizing plate 11. FIG. 31A shows the O-mode, and FIG. 31B shows the E-mode. Both of the first and second polarizing plate supporting member 12B and 11B are made of TAC, which are equivalent to a negative c-plate as mentioned above. Further a slow axis 13A1S of a positive a-plate 13A1 is in parallel to the slow axis 15S of the liquid crystal layer 15 both in the O- and E-modes.

FIGS. 32A and 32B show polarizing condition changes on Poincare sphere upon the black luminance indication, wherein FIG. 32A shows the O-mode, and FIG. 32B shows the E-mode, wherein the S1-S2 cross sections are omitted. A reference 310T1 represents a polarizing condition change due to the first polarizing plate supporting member, a reference 310LC represents a polarizing condition change due to the liquid crystal layer, a reference 310C1 represents a polarizing condition change due to a positive c-plate, a reference 310A1 represents a polarizing condition change due to a positive a-plate, and a reference 310T2 represents a polarizing condition change due to the second polarizing plate supporting member. In these drawings, it is assumed that a retardation of TAC used for the polarizing plate supporting member is from about 30 to 50 nm, the retardation of the first polarizing plate supporting member is equal to that of the second polarizing plate supporting member, and the retardation of the liquid crystal layer is about 300 nm. However, if the retardation of TAC is different between the sides of the first and second polarizing plates 12 and 11, or if the retardation of the liquid crystal layer is 400 nm, which is relatively large, the positive c-plate 13C1 should be replaced with a negative c-plate, and the positive a-plate 13A1 should be replaced with a negative a-plate. Further, the retardation of TAC is independently changed between the first and second polarizing plate sides, and the retardation of the liquid crystal layer is changed, which eliminates the necessity of the c-plate, so that one a-plate provides reduction in luminance change at an inclined view angle to some extent.

Figure 33A:
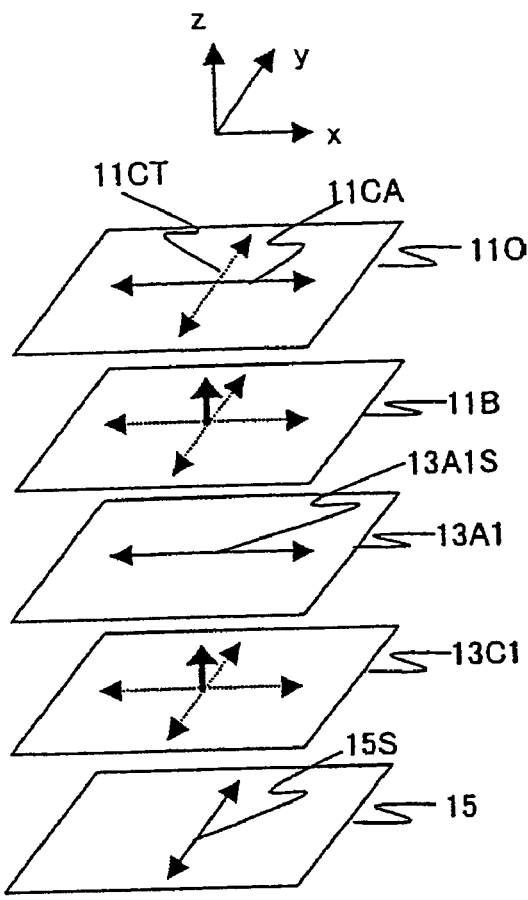
FIGS. 33A and 33B are structural drawings illustrating an embodiment of the liquid crystal display apparatus according to the present invention.
Figure 33A:
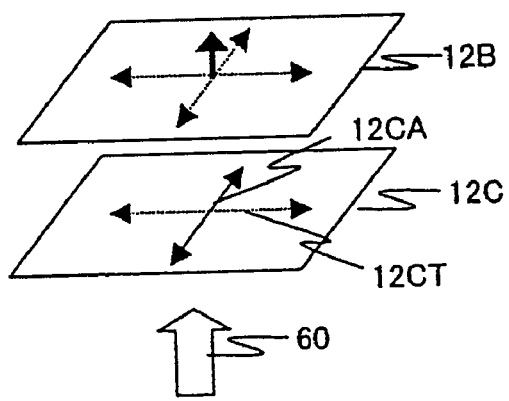
Figure 33B:
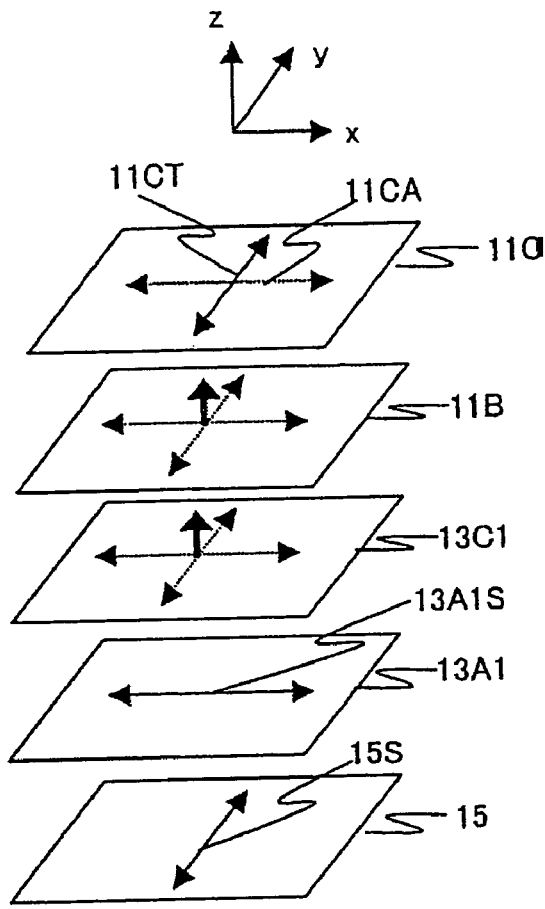
Figure 33B:
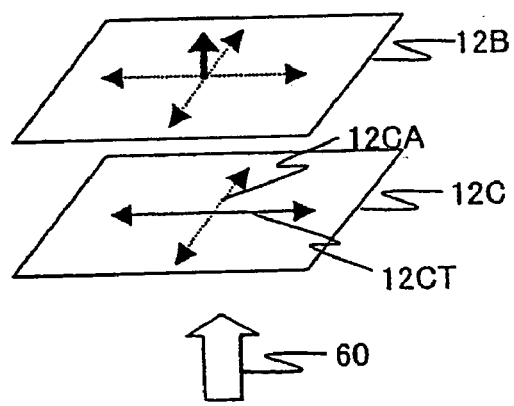
Figure 34A:
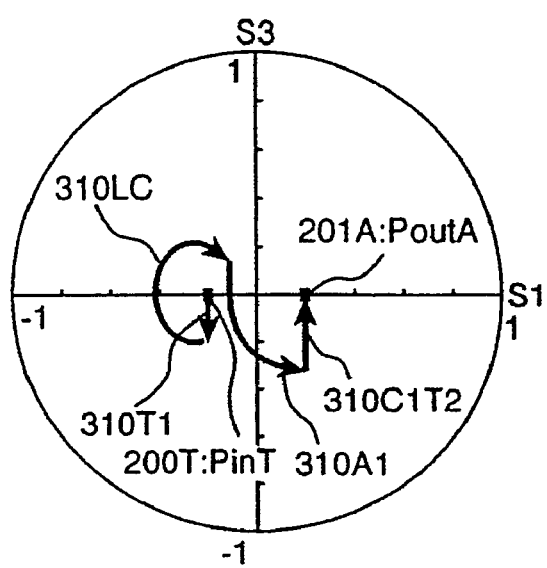
FIGS. 34A and 34B are Poincare sphere drawings illustrating an embodiment of the liquid crystal display apparatus according to the present invention.
Figure 34B:
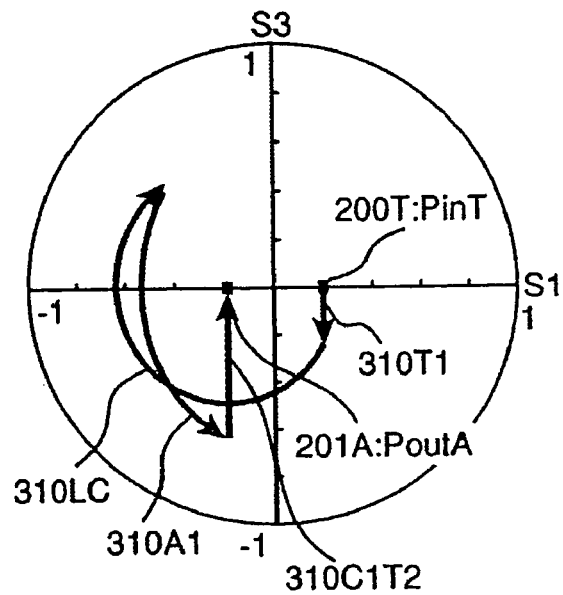

In FIGS. 31A and 31B, the slow axis of the positive a-plate is in parallel to the slow axis of the liquid crystal layer. However, making the slow axis of the positive a-plate in parallel to the slow axis of the liquid crystal layer also provides reduction in the black-representation luminance change at the inclined viewing angle. FIGS. 33A and 33B show such an optical structure. Further, FIGS. 34A and 34B show a polarizing condition change on Poincare sphere. In these drawings, a reference 310C1T2 represents a polarizing condition change due to a positive c-plate and TAC on the side of the second polarizing plate 11.

As mentioned above, though TAC is used for the polarizing plate supporting member, using one c-plate and one a-plate or only one a-plate provides reduction in the luminance change.

TWENTY-SEVENTH EMBODIMENT

In this embodiment, if the polarizing plate supporting members have double refraction characteristics, will be described a method of, with reducing the number of sheets of the optical retardation compensation films, reducing the effect of the liquid crystal layer upon black luminance displaying at an inclined viewing angle, and reducing both black-representation luminance change and color shift.

FIGS. 35A and 35B show, for example, optical structures in the case that the polarizing plate supporting member is made of TAC. FIG. 35A shows the structure for the O-mode, and FIG. 35B shows the structure for the E-mode. In these drawings, a negative a-plate 13A2 is arranged to make its slow axis 13A2S perpendicular to the slow axis 15S.

Figure 36A:
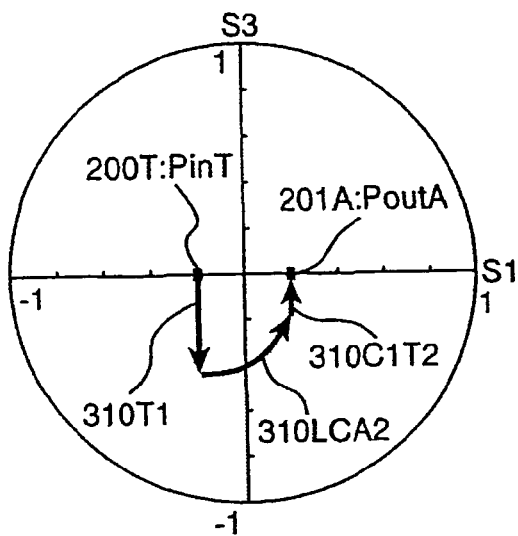
FIGS. 36A and 36B are Poincare sphere drawings of an embodiment of the liquid crystal display apparatus according to the present invention.
Figure 36B:
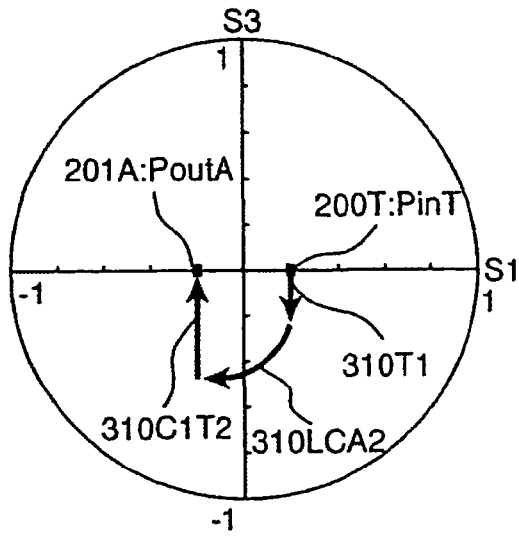

This structure reduces the effect of the liquid crystal layer when viewed at an inclined viewing angle. FIGS. 36A and 36B show polarizing condition changes upon black luminance displaying on Poincare sphere. FIG. 36A shows the O-mode, and FIG. 36B shows the E-mode. In these drawings, references 310LCA2 indicate polarizing condition changes due to the liquid crystal layer and the negative a-plate. Comparison of FIGS. 35A and 35B with FIGS. 32A and 32B and FIGS. 34A and 34B clearly shows the reduction of the effect of the liquid crystal layer. This is provided by making the slow axis of the negative a-plate perpendicular to the slow axis of the liquid crystal layer. As mentioned above, the effect of the liquid crystal layer developed by the fact that the polarizing plate supporting members have the birefringence characteristic can be reduced to necessary minimum.

Figure 37A:
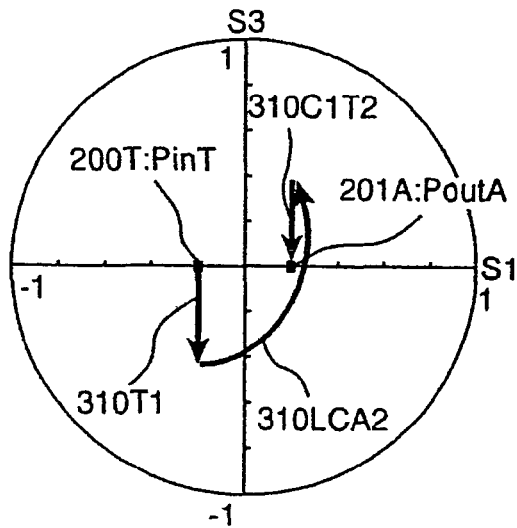
FIGS. 37A and 37B are Poincare sphere drawings illustrating an embodiment of the liquid crystal display apparatus according to the present invention.
Figure 37B:
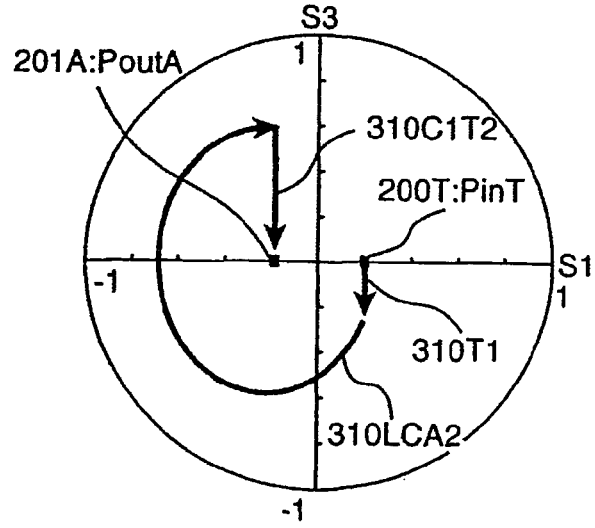

Further, increase in the retardation of the negative a-plate also reduces the black-representation luminance change at an inclined angle by the polarizing condition changes as shown in FIGS. 37A and 37B. In these cases, in accordance with the value of the retardation of TAC, a positive c-plate 13C1 in FIGS. 35A and 35B should be replaced with negative c-plates. In comparison of FIGS. 36A and 36B with FIGS. 37A and 37B, it is clear that the color shift at an inclined viewing angle can be more reduced in the case of FIGS. 36A and 36B, so that the polarizing condition conversion shown in FIGS. 36A and 36B is preferable unless special reasons.

All of the first to twenty-seventh embodiments employ the IPS method. However, this invention is not limited to the IPS method and applicable to the liquid crystal display apparatus in which liquid crystal molecules is aligned in parallel to the substrate upon black-representation luminance displaying.

The first to twenty-seventh embodiments describe the reduction in black-representation luminance (transmittance) and the color shift. In all embodiments, it can be confirmed that a low luminance change and a low color shift is provided in the viewing angle characteristic at a middle tone and at a white area. Further, it is preferable that the retardation compensation film of which $\Delta nd/\lambda$ is substantially constant.

This invention relates to a liquid crystal display, and particularly to the liquid crystal display having the in-plane switching mode in which transmitting and stopping of light was controlled by applying lateral electric field to horizontally aligned liquid crystal molecules to considerably improve its angle of view characteristic regarding the black representation and the dark gradation, thus this invention is applicable to all liquid crystal display apparatuses having the ISP mode.

What is claimed is:

1. A liquid crystal display apparatus comprising:
a first substrate on an incident side comprising a first polarizing plate;
a second substrate, opposite to the first substrate with respect to the incident side, comprising a second polarizing plate, an absorbing axis of the first polarizing plate being substantially perpendicular to that of the second polarizing plate;
a liquid crystal layer between the first and second substrates including liquid crystal molecules aligned in a direction in parallel to the substrates and rotated within a plane in parallel to the first substrate when electric fields are applied to the liquid crystal molecules in a direction in parallel to the first substrate;
a group of electrodes comprising pairs of electrodes defining pixels on a near side to the liquid crystal layer of either of the first or second substrate for generating the electric fields to provide active matrix driving; and
an illumination unit, wherein each of the first and second polarizing plates comprises supporting plates at both sides thereof, the first and second polarizing plates comprise first and second optical phase compensation films for compensating polarizing conditions of transmitted polarizing light on sides of the liquid crystal layer, respectively; slow axes of the first and second optical retardation compensation films are substantially in parallel to absorbing axes of the first and second polarizing plates, respectively, a smaller angle between the slow axis and the absorbing axis ranges from 0 to 2 degrees, and a thickness dr1 of the first optical retardation compensation film is different from that of a thickness dr2 of the second optical retardation compensation film.

2. The liquid crystal display apparatus as claimed in claim 1, wherein a smaller angle between the absorbing axis of the first polarizing plate and that of the second polarizing plate substantially ranges from 88 to 90 degrees.

3. The liquid crystal display apparatus as claimed in claim 2, wherein the liquid crystal layer comprises either interfaces of anti-parallel alignment of which pre-tilt angle at an initial condition is not greater than 3 degrees or interfaces of the liquid crystal layer has a parallel alignment.

4. The liquid crystal display apparatus as claimed in claim 1, wherein the supporting plates on the first and second polarizing plates have thicknesses not less than 20 µm and not greater than 200 µm.

5. The liquid crystal display apparatus as claimed in claim 4, wherein the first and second optical retardation compensation films have Nz coefficients not greater than 1.0.

6. The liquid crystal display apparatus as claimed in claim 4, wherein the first and second optical retardation compensation films have Nz coefficients Nz1 and Nz2, respectively, $-1 < Nz1, Nz2 < 1.0$, the Nz coefficient Nz1 is substantially equal to the Nz coefficient Nz2, and $Nz1 - 0.15 < Nz2 < Nz1 + 0.15$.

7. The liquid crystal display apparatus as claimed in claim 6, wherein the liquid crystal layer comprises either interfaces of anti-parallel alignment of which pre-tilt angle at an initial condition is not greater than 3 degrees or interfaces of the liquid crystal layer has a parallel alignment.

8. The liquid crystal display apparatus as claimed in claim 5, wherein the liquid crystal layer comprises either interfaces of anti-parallel alignment of which pre-tilt angle at an initial condition is not greater than 3 degrees or interfaces of the liquid crystal layer has a parallel alignment.

9. The liquid crystal display apparatus as claimed in claim 4, wherein the liquid crystal layer comprises either interfaces of anti-parallel alignment of which pre-tilt angle at an initial condition is not greater than 3 degrees or interfaces of the liquid crystal layer has a parallel alignment.

10. The liquid crystal display apparatus as claimed in claim 1, wherein the liquid crystal layer comprises either interfaces of anti-parallel alignment of which pre-tilt angle at an initial condition is not greater than 3 degrees or interfaces of the liquid crystal layer has a parallel alignment.

11. The liquid crystal display apparatus as claimed in claim 10, wherein the first and second optical retardation compensation films have Nz coefficients Nz1 and Nz2, respectively, when $-0.15 < X \equiv Nz1$, and $X \equiv Nz2 < 0.15$,
in an O-mode when the absorbing axis of the first polarizing plate is substantially in parallel to an alignment direction of the liquid crystal molecules in the absence of application of the electric fields, a smaller angle between the absorbing axis of the first polarizing plate and an alignment direction of the liquid crystal layer ranging from 0 to 2 degrees, a first equation of $40 + 1.056 \cdot X - 0.0004 \cdot X^2 \leq \Delta nr2 \cdot dr2 \leq 140 + 1.056 \cdot X - 0.0004 \cdot X^2$ and a second equation of $110 + X - 0.0047 \cdot X^2 \leq \Delta nr1 \cdot dr1 \leq 270 + X - 0.0047 \cdot X^2$ are satisfied, and
in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, a third equation of $40 + 1.056 \cdot X - 0.0004 \cdot X^2 \leq \Delta nr1 \cdot dr1 \leq 140 + 1.056 \cdot X - 0.0004 \cdot X^2$ and a fourth equation of $110 + X - 0.0047 \cdot X^2 \leq \Delta nr2 \cdot dr2 \leq 270 + X - 0.0047 \cdot X^2$ are satisfied.

12. The liquid crystal display apparatus as claimed in claim 8, wherein the first and second optical retardation compensation films have Nz coefficients Nz1 and Nz2, respectively, when $0.35 < X \equiv Nz1$, $X \equiv Nz2 < 0.65$,
in an O-mode when the absorbing axis of the first polarizing plate is substantially in parallel to an alignment direction of the liquid crystal molecules in the absence of application of the electric fields, a smaller angle between the absorbing axis of the first polarizing plate and an alignment direction of the liquid crystal layer ranging from 0 to 2 degrees, a first equation of $185 + 1.155 \cdot X - 0.0138 \cdot X^2 \leq \Delta nr2 \cdot dr2 \leq 315 + 1.252 \cdot X - 0.0134 \cdot X^2$ and a second equation of $-35 + 2.86 X - 0.00964 \cdot X^2 \leq \Delta nr1 \cdot dr1 \leq 90 + 3.04 \cdot X - 0.00465 \cdot X^2$ are satisfied, and
in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, a third equation of $185 + 1.155 \cdot X - 0.0138 \cdot X^2 \leq \Delta nr1 \cdot dr1 \leq 315 + 1.252 \cdot X - 0.0134 \cdot X^2$ and a fourth equation of $-35 + 2.86 \cdot X - 0.00964 \cdot X^2 \leq \Delta nr2 \cdot dr2 < 90 + 3.04 X - 0.00465 \cdot X^2$ are satisfied.

13. The liquid crystal display apparatus as claimed in claim 10, wherein the first and second optical retardation compensation films have Nz coefficients Nz1 and Nz2, respectively, in an O-mode when the absorbing axis of the first polarizing plate is substantially in parallel to an alignment direction of the liquid crystal molecules in the absence of application of the electric fields, a smaller angle between the absorbing axis of the first polarizing plate and an alignment direction of the liquid crystal layer ranging from 0 to 2 degrees, $0.35 < Nz1 < 0.65$ and $-0.1 < Nz2 < 0.65$, and in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, $0.35 < Nz2 < 0.65$ and $-0.1 < Nz1 < 0.65$.

14. The liquid crystal display apparatus as claimed in claim 10, wherein the first and second optical retardation compensation films have Nz coefficients Nz1 and Nz2, respectively, in an O-mode when the absorbing axis of the first polarizing plate is substantially parallel to an alignment direction of the liquid crystal molecules in the absence of application of the electric fields, a smaller angle between the absorbing axis of the first polarizing plate and an alignment direction of the liquid crystal layer ranging from 0 to 2 degrees, $-0.15 < Nz1 < 0.15$ and $-0.1 < Nz2 < 1.0$, and in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, $-0.15 < Nz2 < 0.15$ and $-0.1 < Nz1 < 1.0$.

15. The liquid crystal display apparatus as claimed in claim 10, wherein the first and second optical retardation compensation films have Nz coefficients Nz1 and Nz2, respectively, in an O-mode when the absorbing axis of the first polarizing plate is substantially in parallel to an alignment direction of the liquid crystal molecules in the absence of application of the electric fields, a smaller angle between the absorbing axis of the first polarizing plate and an alignment direction of the liquid crystal layer ranging from 0 to 2 degrees, $-0.05 < Nz1 < 0.4$ and $-0.35 < Nz2 < 1.0$, and in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, $-0.05 < Nz2 < 0.4$ and $-0.35 < Nz1 < 1.0$.

16. The liquid crystal display apparatus as claimed in claim 10, wherein the first and second optical retardation compensation films have Nz coefficients Nz1 and Nz2, respectively, in an O-mode when the absorbing axis of the first polarizing plate is substantially in parallel to an alignment direction of the liquid crystal molecules in the absence of application of the electric fields, a smaller angle between the absorbing axis of the first polarizing plate and an alignment direction of the liquid crystal layer ranging from 0 to 2 degrees, $Nz1 < 1.0$ and $0.35 < Nz2 < 0.65$, and in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, $Nz2 < 1.0$ and $0.35 < Nz1 < 0.65$.

17. The liquid crystal display apparatus as claimed in claim 10, wherein the first and second optical retardation compensation films have Nz coefficients Nz1 and Nz2, respectively, in an O-mode when the absorbing axis of the first polarizing plate is substantially parallel to an alignment direction of the liquid crystal molecules in the absence of application of the electric fields, a smaller angle between the absorbing axis of the first polarizing plate and an alignment direction of the liquid crystal layer ranging from 0 to 2 degrees, $Nz1 < 0.65$ and $-0.15 < Nz2 < 0.15$, and in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, $Nz2 < 0.65$ and $-0.15 < Nz1 < 0.15$.

18. The liquid crystal display apparatus as claimed in claim 10, wherein the first and second optical retardation compensation films have Nz coefficients Nz1 and Nz2, respectively, in an O-mode when the absorbing axis of the first polarizing plate is substantially parallel to an alignment direction of the liquid crystal molecules in the absence of application of the electric fields, a smaller angle between the absorbing axis of the first polarizing plate and an alignment direction of the liquid crystal layer ranging from 0 to 2 degrees, $Nz1 < 0.85$ and $0.1 < Nz2 < 0.4$, and in an E-mode when the absorbing axis of the first polarizing plate is substantially perpendicular to the alignment direction of the liquid crystal molecules in the absence of application of the electric fields, a smaller angle between the absorbing axis of the first polarizing plate and the alignment direction ranging from 88 to 90 degrees, $Nz2 < 0.85$ and $0.1 < Nz1 < 0.4$.

* * * * *